(12) United States Patent
Cho

(10) Patent No.: US 7,364,526 B2
(45) Date of Patent: Apr. 29, 2008

(54) COMPOUND PLANETARY GEAR SET AND GEAR TRAINS

(76) Inventor: Moon-Haeng Cho, 504-203 Daerim Apt., #20 Muk 1-dong, Jungnang-gu, Seoul (KR)

( * ) Notice: Subject to any disclaimer, the term of this patent is extended or adjusted under 35 U.S.C. 154(b) by 239 days.

(21) Appl. No.: 10/554,785

(22) PCT Filed: Dec. 17, 2004

(86) PCT No.: PCT/KR2004/003326

§ 371 (c)(1),
(2), (4) Date: Oct. 28, 2005

(87) PCT Pub. No.: WO2005/061924

PCT Pub. Date: Jul. 7, 2005

(65) Prior Publication Data

US 2006/0293143 A1   Dec. 28, 2006

(30) Foreign Application Priority Data

Dec. 23, 2003   (KR) .......................... 2003-0095438

(51) Int. Cl.
*F16H 3/62*   (2006.01)
(52) U.S. Cl. ...................... 475/279; 475/319
(58) Field of Classification Search ................ 475/319, 475/290, 291, 296, 314, 279
See application file for complete search history.

(56) References Cited

U.S. PATENT DOCUMENTS 4,020,716 A   5/1977   Toth et al.
5,135,444 A * 8/1992   Hattori ........................ 475/285
5,558,589 A   9/1996   Schmidt
5,853,345 A * 12/1998   Park ........................... 475/284

FOREIGN PATENT DOCUMENTS

JP   2001-304355   10/2001
KR   1998-0046721   9/1998

OTHER PUBLICATIONS

International Search Report.

* cited by examiner

*Primary Examiner*—Sherry Estremsky
*Assistant Examiner*—Edwin A Young
(74) *Attorney, Agent, or Firm*—Harness, Dickey & Pierce, P.L.C.

(57) ABSTRACT

A compound planetary gear set converts engine power into four forward-speeds and one reverse-speed, and the gear train provides eight forward-speeds and two reverse-speeds by utilizing the compound planetary gear set. The compound planetary gear set includes a first sun gear, first planetary gears engaged with the first sun gear, a first ring gear engaged with the first planetary gears, a second sun gear, second planetary gears engaged with the second sun gear and integrally formed with the first planetary gears, third planetary gears engaged with the second planetary gears, a second ring gear engaged with the third planetary gears, and a compound planet carrier for supporting the first to third planetary gears. The compound planetary gear set can be controlled by four frictional elements.

14 Claims, 12 Drawing Sheets

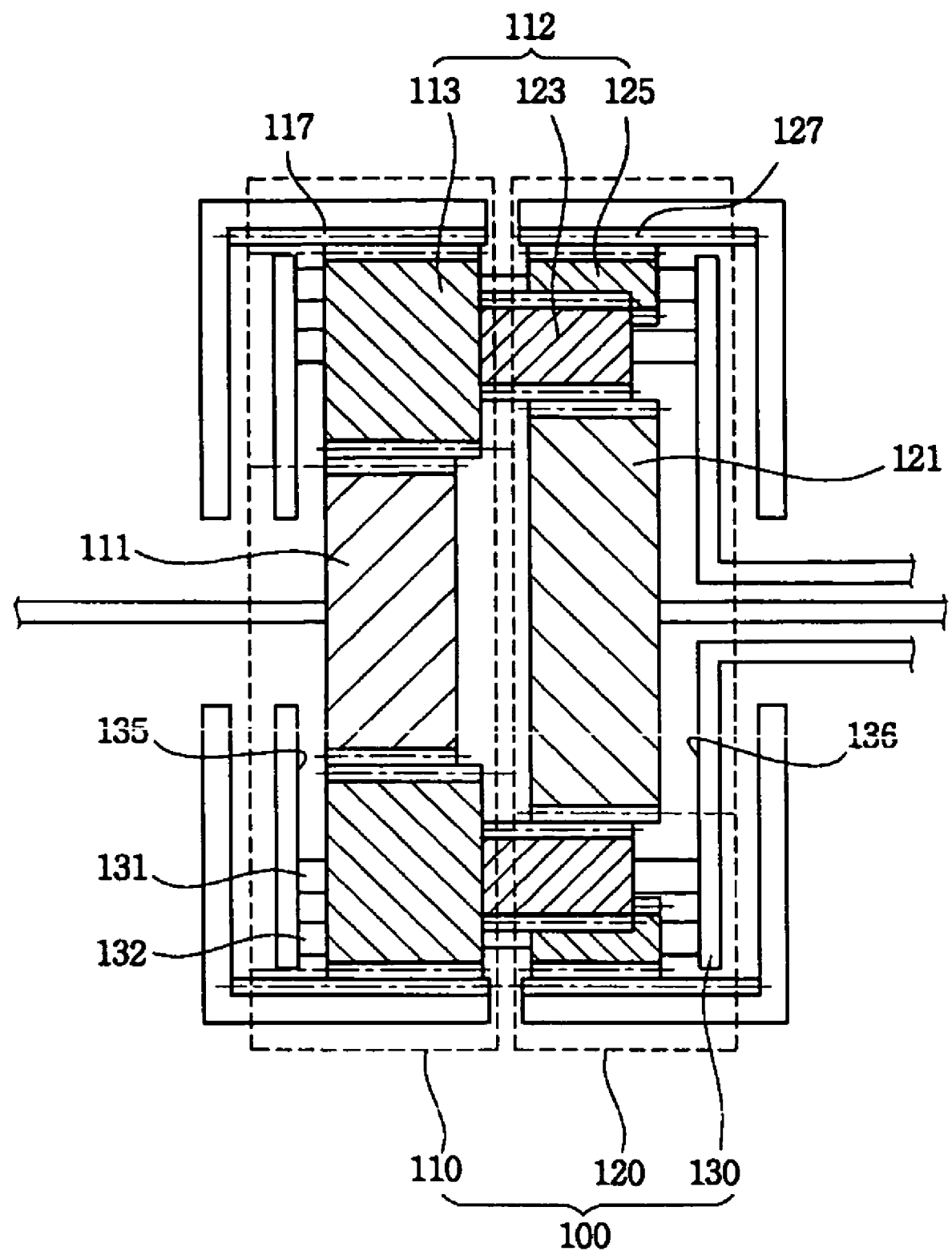
[Fig. 1]

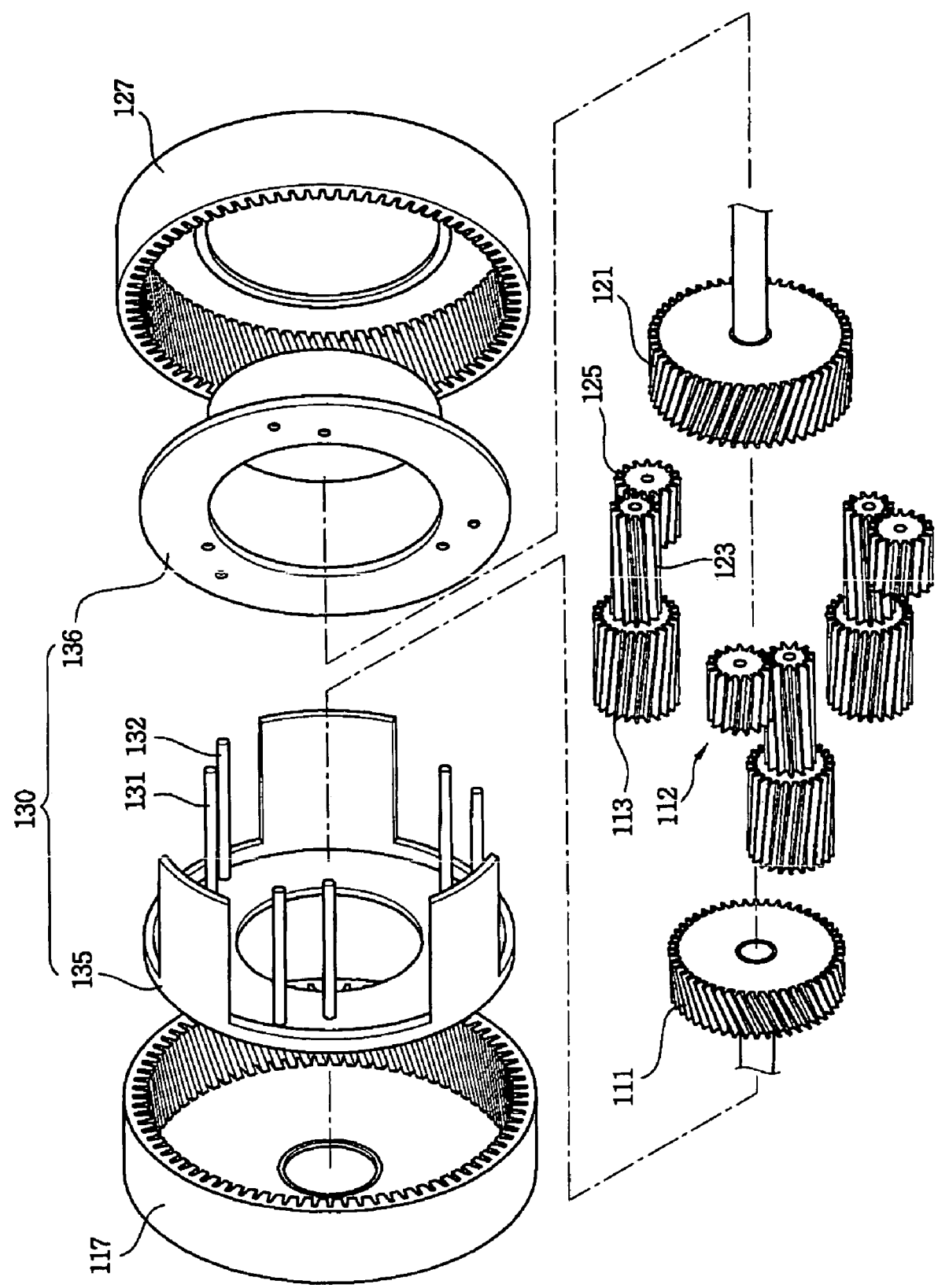
[Fig. 2]

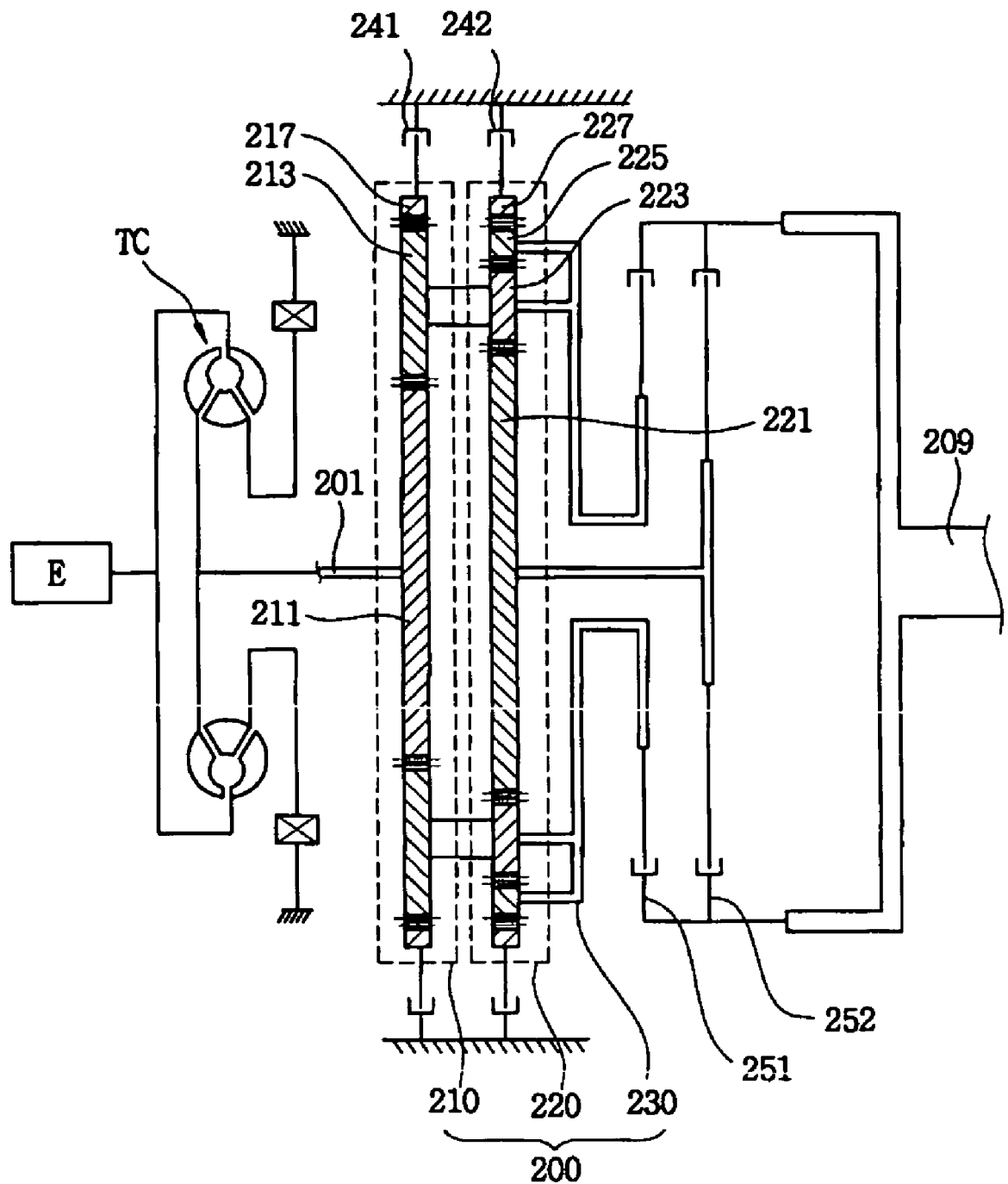
[Fig. 3]

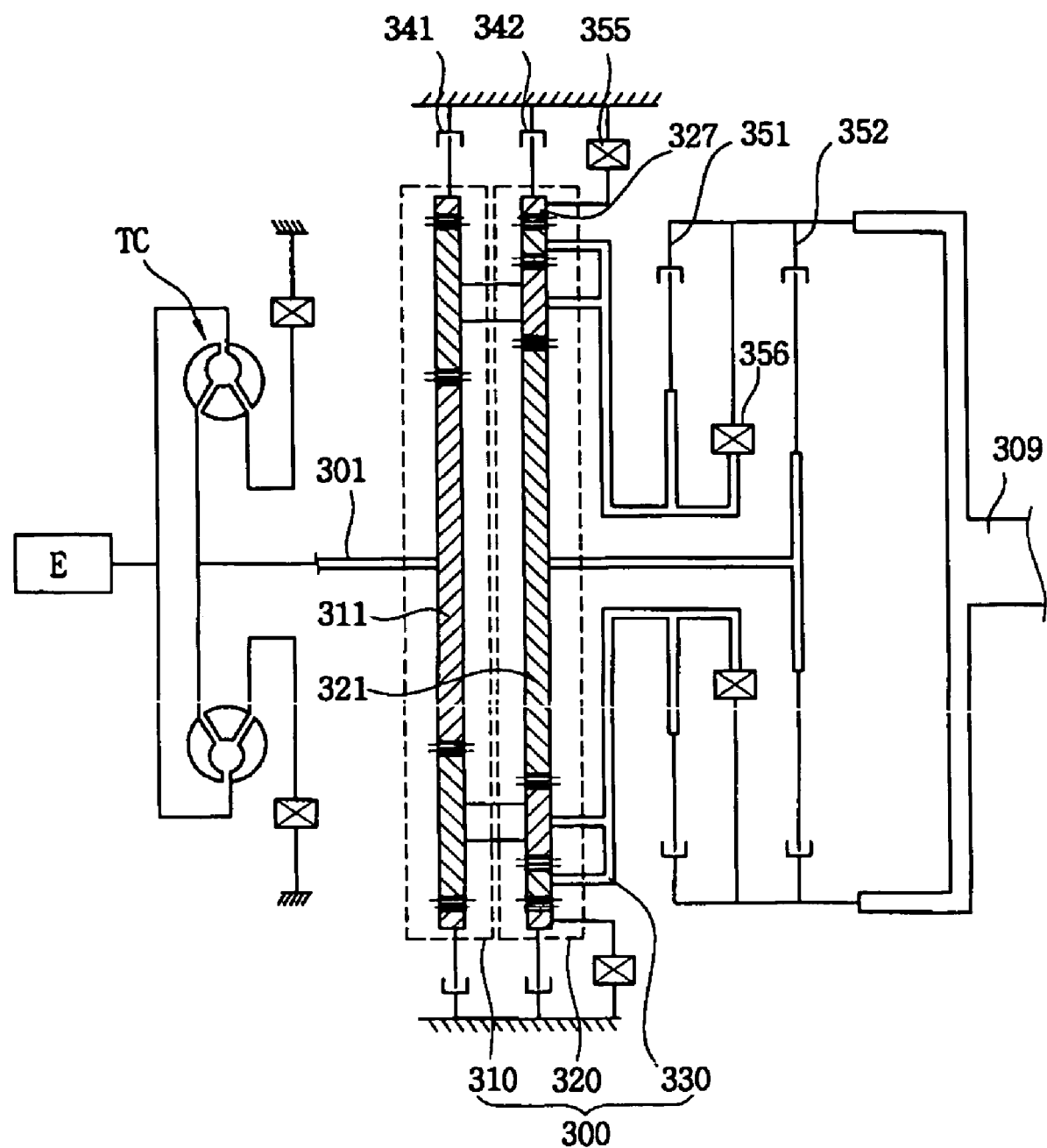
[Fig. 4]

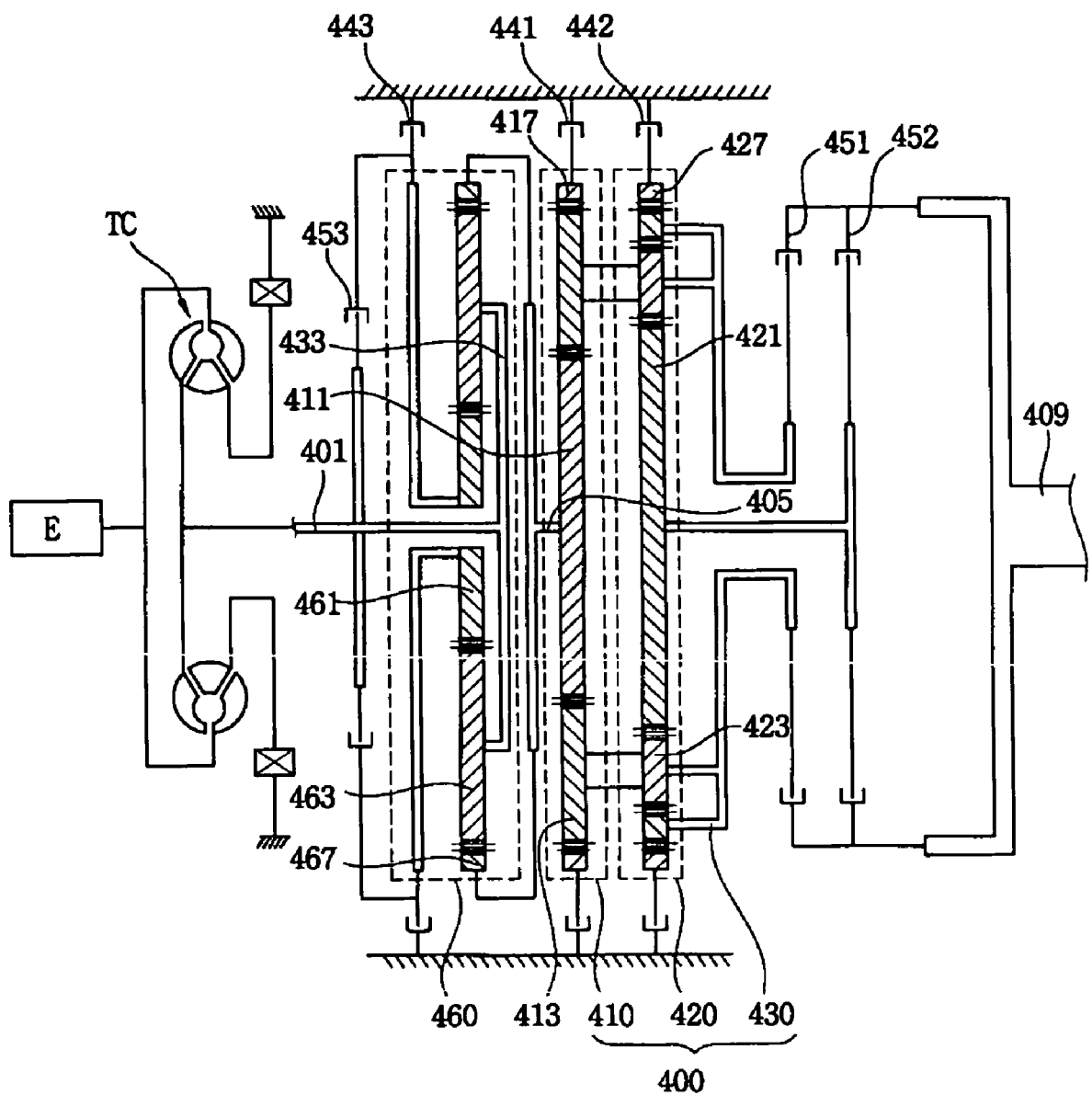
[Fig. 5]

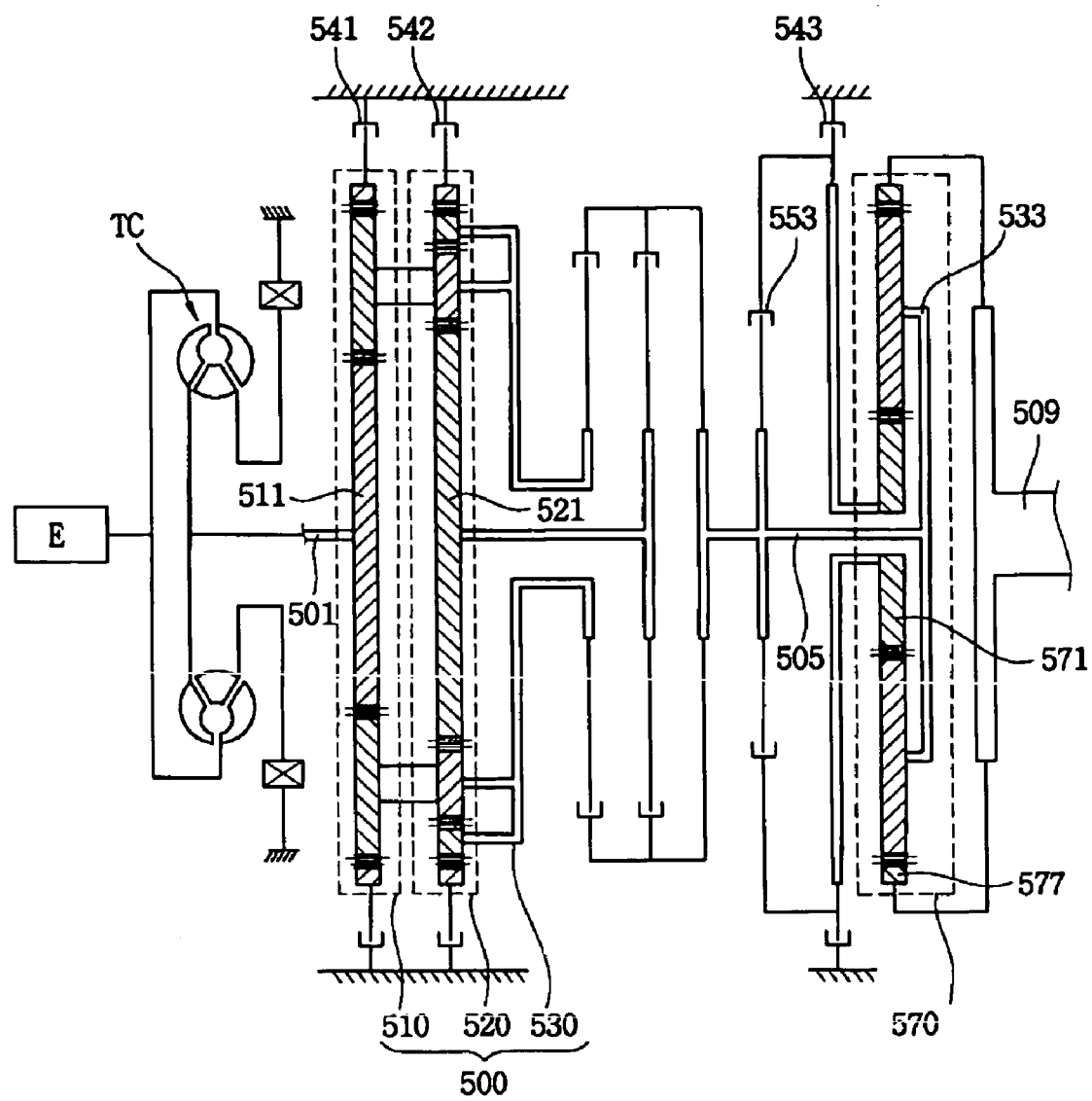
[Fig. 6]

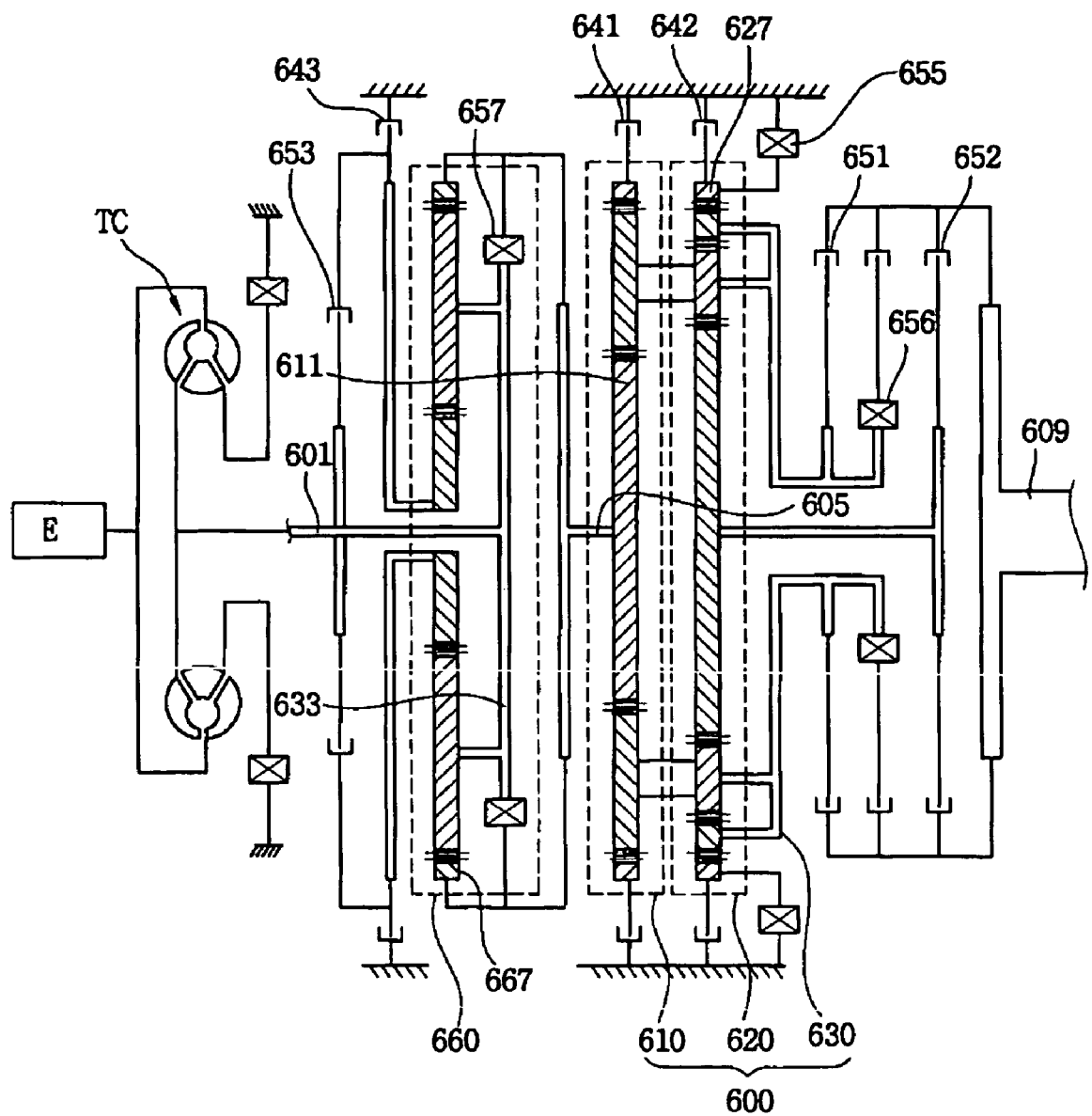

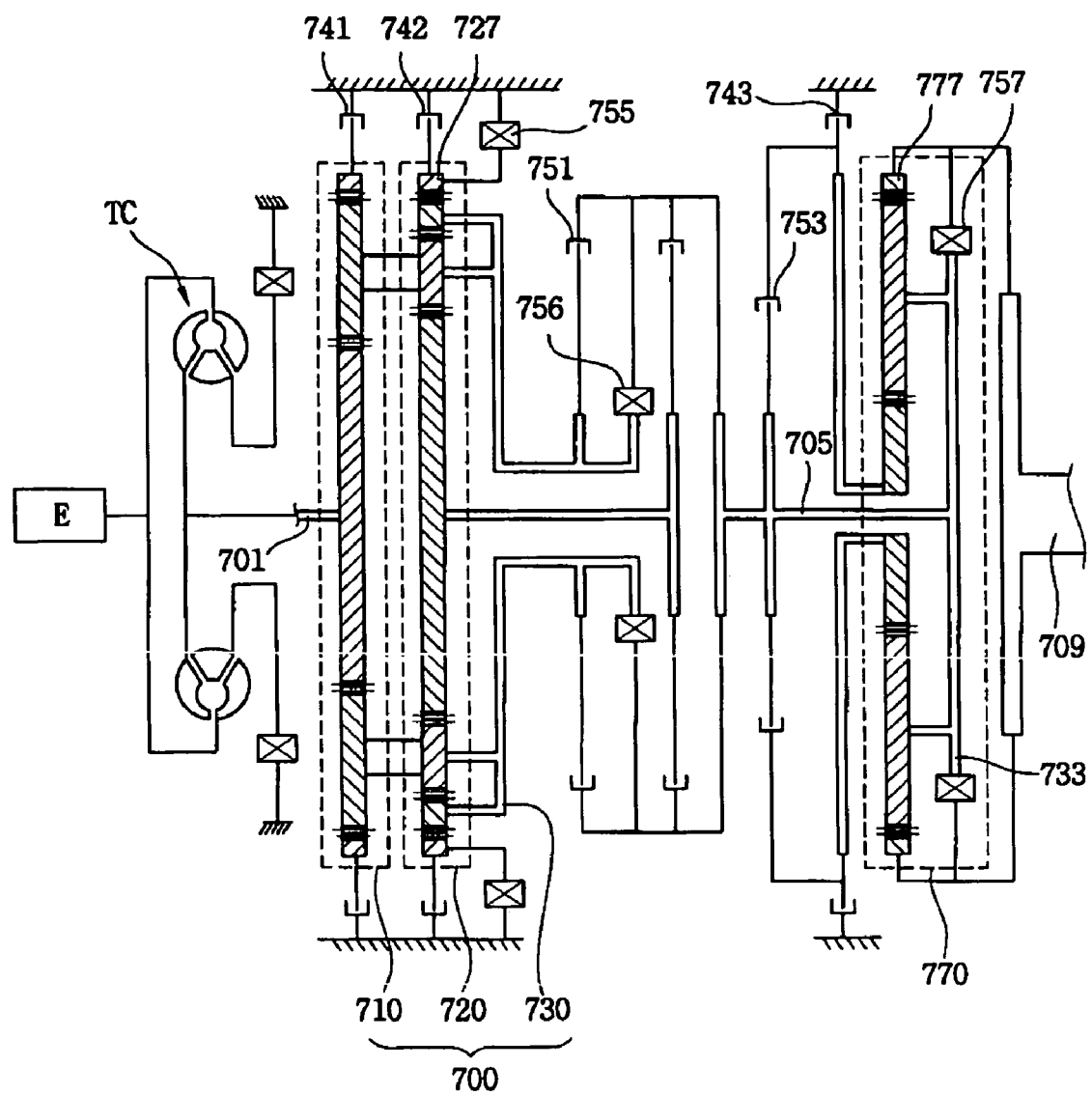
[Fig. 8]

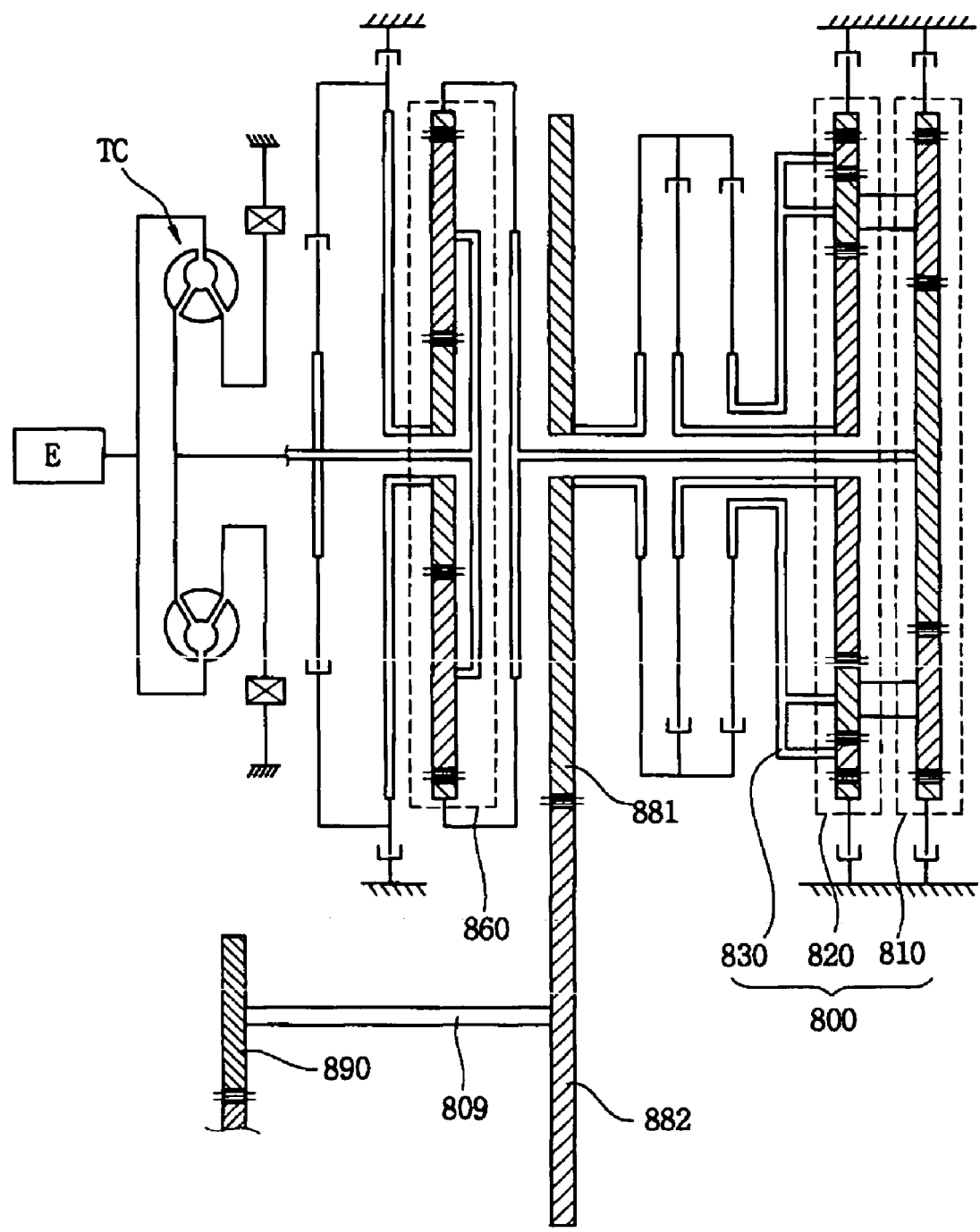
[Fig. 9]

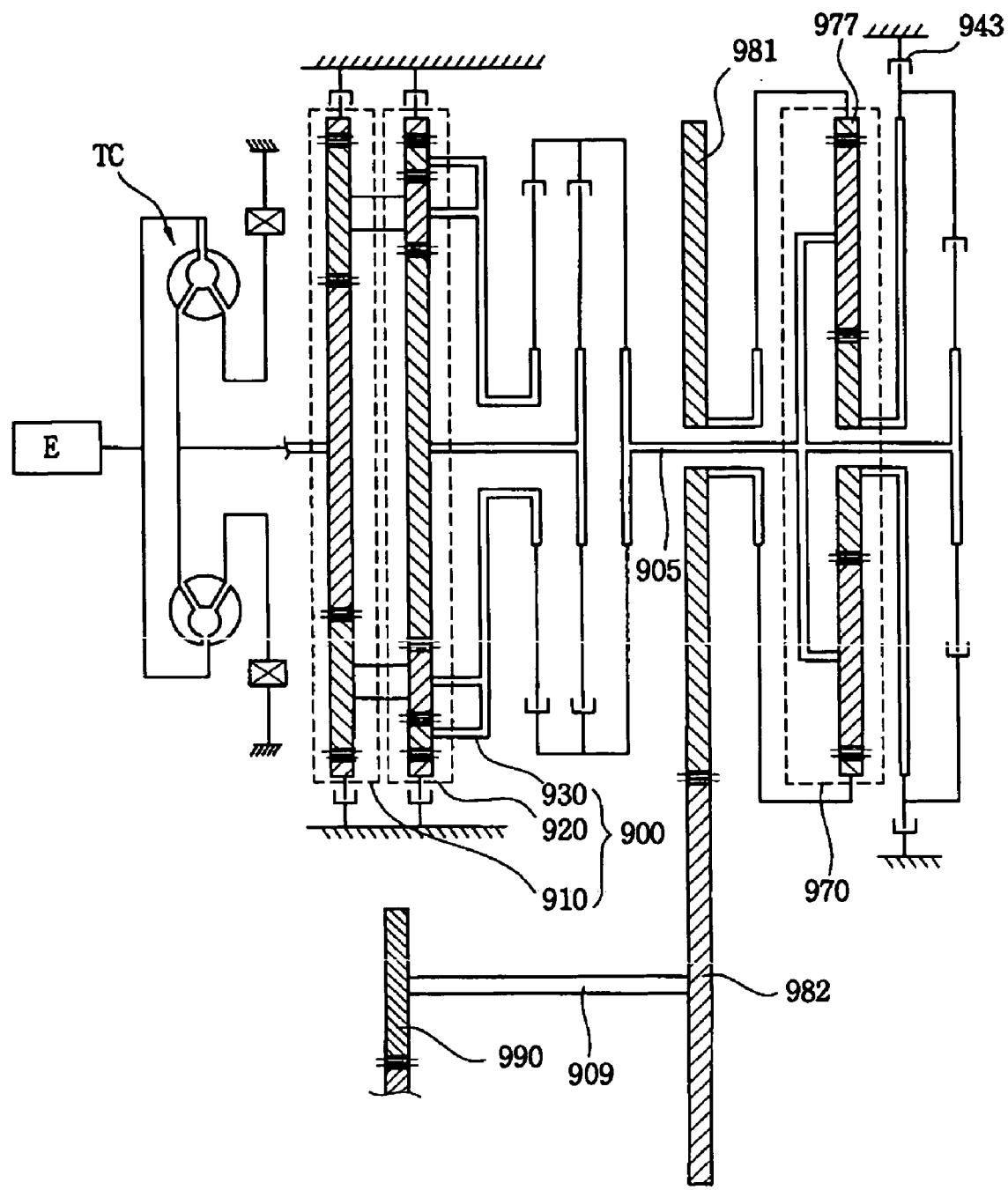
[Fig. 10]

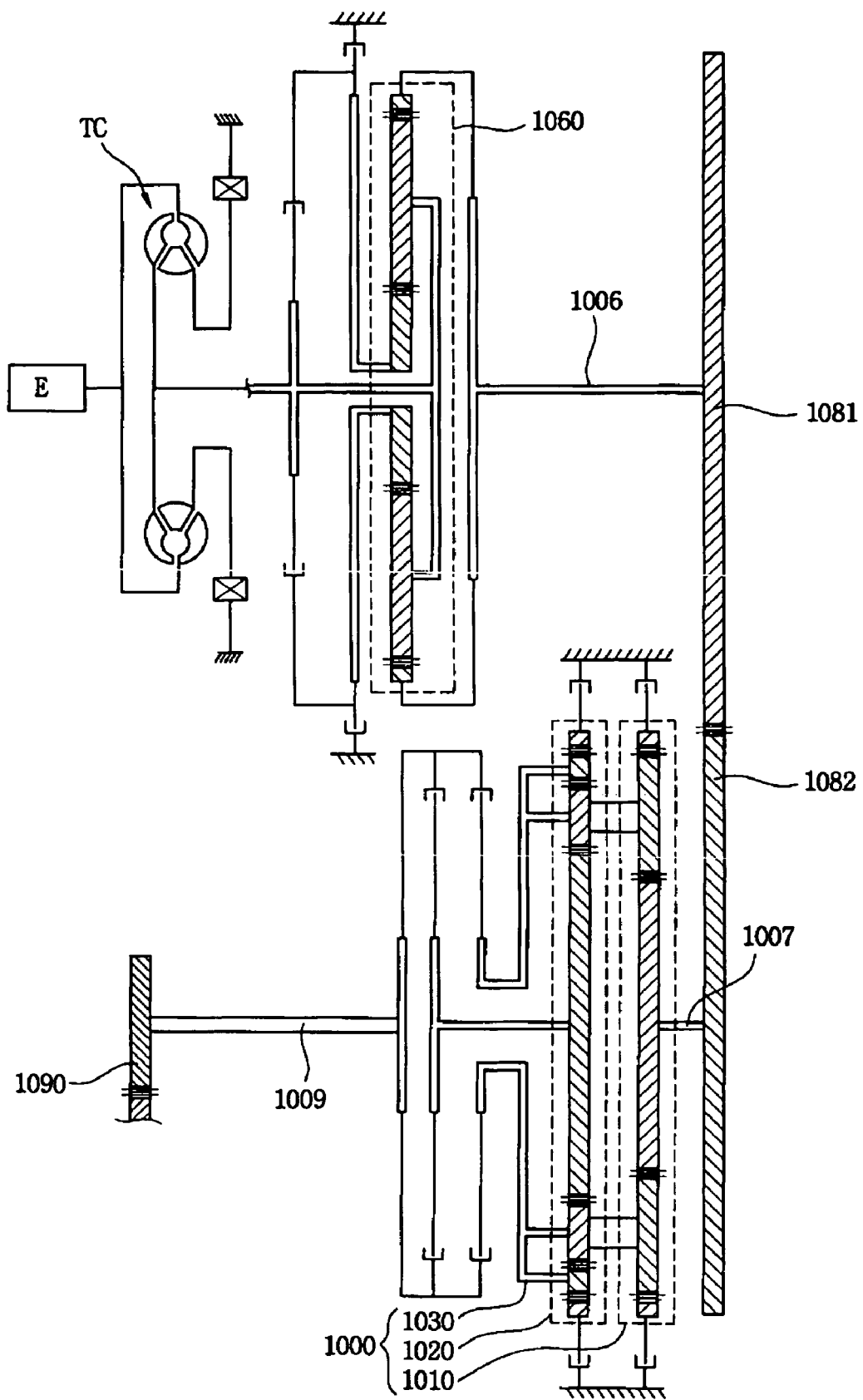

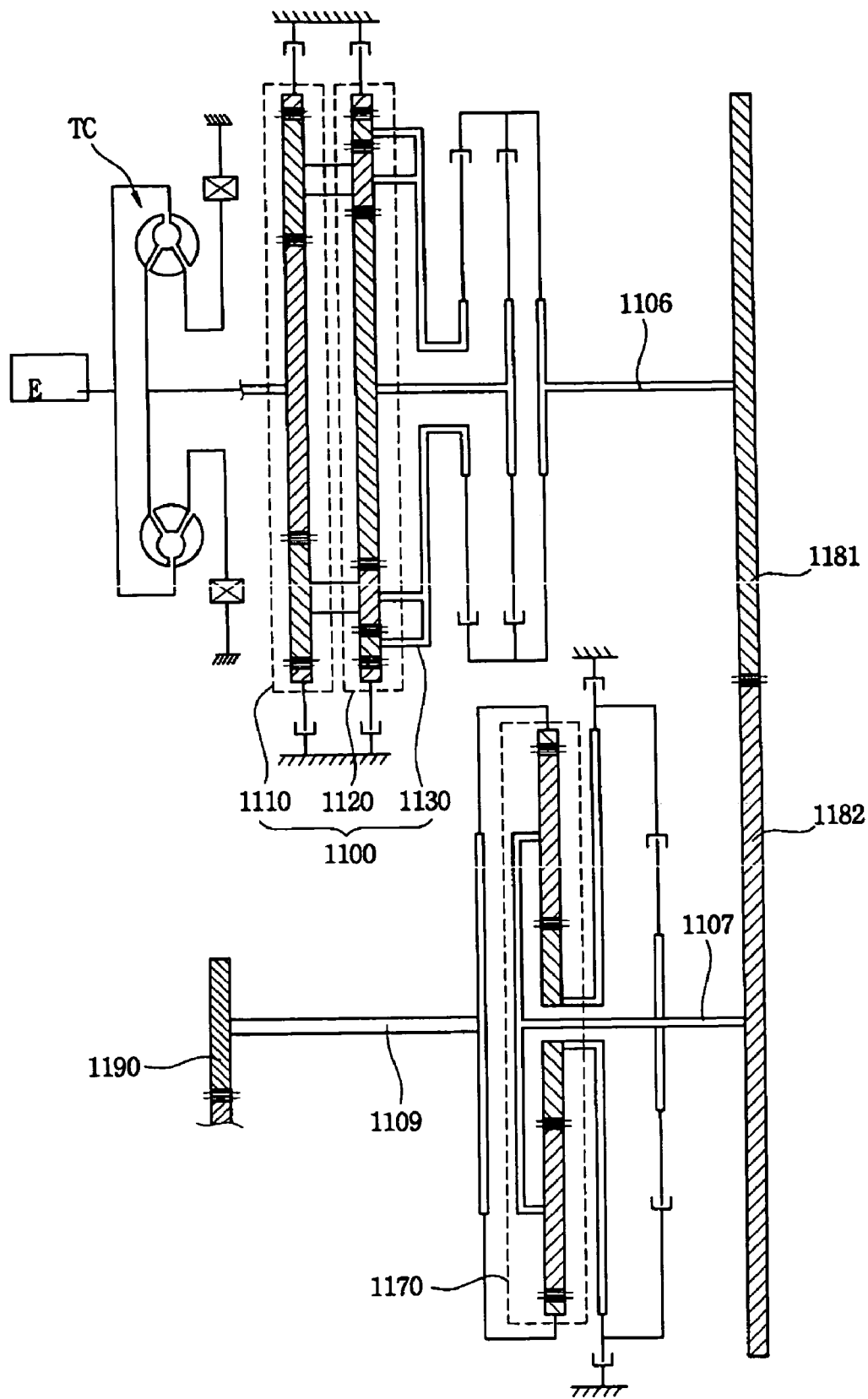
[Fig. 12]

COMPOUND PLANETARY GEAR SET AND GEAR TRAINS

TECHNICAL FIELD

The present invention relates to a compound planetary gear set and gear trains having the same. More particularly, the present invention relates to a compound planetary gear set capable of providing four forward-speed ratios and one reverse-speed ratio, and gear trains for providing eight forward-speed ratios and two reverse-speed ratios by utilizing the compound planetary gear set.

BACKGROUND ART

Although an automatic transmission is less efficient in terms of fuel economy than a manual transmission, more and more cars are equipped with the automatic transmissions.

In general, an automatic transmission includes a hydraulic torque converter, a gear train having planetary gear sets, friction elements for engaging/disengaging various members of the gear train, a hydrostatic oil pump supplying a hydraulic pressure to the torque converter and the friction elements, and hydraulic/electronic control devices.

The torque converter not only allows smooth gear shifting but also has other merits allowing easy and comfortable driving.

However, the main reason why automatic transmissions are inferior to manual transmissions in terms of fuel economy lies in the basic hydrokinetic operational principle of the torque converter that can never be an object of alteration or improvement.

To make the fuel economy of automobiles equipped with automatic transmissions reach or surpass that of the automobiles equipped with manual transmissions, a great improvement of the gear train is indispensable to compensate for the shortcoming of the torque converter.

When a car cruises at a constant speed, the torque converter does not cause any power loss because there is no slip, due to the operation of a torque converter clutch, between an impeller and a turbine in the torque converter.

However, when a car moves at low and/or unsteady speed as in congested cities, a torque converter clutch does not operate steadily and consequent slips between the impeller and the turbine in the torque converter make the fuel economy poorer.

Then, to attain a better fuel economy with the automatic transmission, the gear train must be improved so that operation range of the torque converter clutch may be expanded.

To realize such an improvement, step ratios between lower speed ratios have to be remarkably diminished compared to those of existing automatic transmissions.

Apart from the consideration about the torque converter, a best way of improving the fuel economy of automobiles is to increase the number of speed ratios on condition that compactness of the gear train is not seriously harmed.

Then, a desirably improved gear train will be required to provide a large number of speed ratios with considerably small step ratios between lower speed ratios.

A best way to satisfy above requirement will be to make the gear train provide a large number of speed ratios with uniform step ratios.

Such a solution well suits the knowledge that uniform step ratios are most efficient in eliminating less sufficient matches between engine speeds and desired car speeds.

DISCLOSURE OF INVENTION

Technical Problem

There are some gear trains, developed for work vehicles, providing a large number of speed ratios with uniform step ratios.

However, such gear trains are too heavy and bulky to be employed for light vehicles as passenger cars because of their quite complicated structure having too many planetary gear sets.

Considering the mechanism of the planetary gear sets, an optimum solution to developing a simplest gear train providing a large number of gear ratios may be coupling a simple planetary gear set providing two speeds with a compound planetary gear set that can provide four forward-speeds and one reverse-speed.

However, to provide uniform step ratios, step ratios of the compound planetary gear set must be uniform while the step ratio of the simple planetary gear set must be the square root of the step ratios of the compound planetary gear set.

The simple planetary gear set has been widely utilized since considerably long time ago and its structure and functioning are well known.

Compound planetary gear sets which are widely employed for the cars currently on the market can be grouped into three types: Simpson type, Ravigneaux type and a combination of two simple gear sets called two-simple type.

However, it is very difficult, if not impossible, to make the compound planetary gear sets provide speed ratios with uniform step ratios.

When one of the compound planetary gear sets is coupled with a simple planetary gear set, the combination may provide eight speed ratios numerically. However, practically, it is very difficult to get more than six speed ratios from the combination because some speed ratios among the eight possible speed ratios are too near to other speed ratios.

Then, to construct a simplest gear train capable of providing eight forward-speeds with uniform step ratios, a new type of compound planetary gear set that can provide four forward-speeds with uniform step ratios and at least one reverse-speed is definitely required.

Technical Solution

Therefore, the present invention has been made in view of the above-mentioned requirements, and it is a first object of the present invention to provide a compound planetary gear set that may be utilized in developing a gear train for providing four forward-speeds with uniform step ratios and one reverse-speed.

A second object of the present invention is to provide gear trains having the compound planetary gear set that may be controlled by a minimum of friction elements.

In order to accomplish the first object, a compound planetary gear set includes a single planetary gear part including a first sun gear, a plurality of first planetary gears meshed with the first sun gear, and a first ring gear meshed with the first planetary gears, a double planetary gear part including a second sun gear, a plurality of second planetary gears meshed with the second sun gear, coupled fixedly with the first planetary gears and having diameters smaller than diameters of the first planetary gears, a plurality of third planetary gears meshed with the second planetary gears, and a second ring gear meshed with the third planetary gears, and a planet carrier for rotatably supporting the first to third planetary gears.

In order to accomplish the second object, a gear train includes an input shaft, a single planetary gear part including a first sun gear connected to the input shaft, a plurality of first planetary gears meshed with the first sun gear, and a first ring gear meshed with the first planetary gears, a double planetary gear part including a second sun gear, a plurality of second planetary gears meshed with the second sun gear, coupled fixedly with the first planetary gears and having diameters smaller than diameters of the first planetary gears, a plurality of third planetary gears meshed with the second planetary gears, and a second ring gear meshed with the third planetary gears, a planet carrier for rotatably supporting the first to third planetary gears, a first brake means for selectively stopping the rotation of the first ring gear, a second brake means for selectively braking the rotation of the second ring gear, an output shaft selectively coupled with the planet carrier and/or the second sun gear, a first clutch for coupling/decoupling the planet carrier to/from the output shaft, and a second clutch for coupling/decoupling the second sun gear to/from the output shaft.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a cross sectional view illustrating a compound planetary gear set according to an exemplary embodiment of the present invention;

FIG. 2 is an exploded perspective view illustrating the compound planetary gear set shown in FIG. 1;

FIG. 3 is a partially cross sectional view illustrating a gear train of an automatic transmission according to a first embodiment of the present invention;

FIG. 4 is a partially cross sectional view illustrating a gear train of an automatic transmission according to a second embodiment of the present invention;

FIG. 5 is a partially cross sectional view illustrating a gear train of an automatic transmission according to a third embodiment of the present invention;

FIG. 6 is a partially cross sectional view illustrating a gear train of an automatic transmission according to a fourth embodiment of the present invention;

FIG. 7 is a partially cross sectional view illustrating a gear train of an automatic transmission according to a fifth embodiment of the present invention;

FIG. 8 is a partially cross sectional view illustrating a gear train of an automatic transmission according to a sixth embodiment of the present invention;

FIG. 9 is a partially cross sectional view illustrating a gear train of an automatic transmission according to a seventh embodiment of the present invention;

FIG. 10 is a partially cross sectional view illustrating a gear train of an automatic transmission according to an eighth embodiment of the present invention;

FIG. 11 is a partially cross sectional view illustrating a gear train of an automatic transmission according to a ninth embodiment of the present invention; and FIG. 12 is a partially cross sectional view illustrating a gear train of an automatic transmission according to a tenth embodiment of the present invention.

BEST MODE FOR CARRYING OUT THE INVENTION

Structure of Compound Planetary Gear Set

FIG. 1 is a cross sectional view illustrating a compound planetary gear set according to an exemplary embodiment of the present invention and FIG. 2 is an exploded perspective view illustrating the compound planetary gear set shown in FIG. 1.

Structures and configuration of elements shown in FIG. 2 are prepared for illustrative purpose only, and the present invention is not limited to those elements shown in FIG. 2. Particularly, it is not necessary to define the shapes of side plates 135 and 136 of a planet carrier as circular shapes. That is, the side plates 135 and 136 may be formed in various shapes so long as the side plates 135 and 136 safely accommodate first and second planetary-gear-shafts 131 and 132 therein and supporting members fixedly inserted between the side plates 135 and 136 may solidly secure the side plates 135 and 136 without making contact with gears. Since the present invention does not intend to specify the supporting members, they are omitted from FIGS. 1 and 2.

A compound planetary gear set 100 has a compound structure including one single planetary gear part 110 and one double planetary gear part 120. The double planetary gear part 120 shares a planet carrier 130 with the single planetary gear part 110. Although the planet carrier 130 is not independent from the two planetary gear parts, since the planet carrier 130 is not a part of any one of the two planetary gear parts, the planet carrier 130 will be separately explained for convenience.

Thus, the compound planetary gear set 100 includes the single planetary gear part 110, the double planetary gear part 120, and the planet carrier 130.

The single planetary gear part 110 has a first sun gear 111 coupled with an input shaft, a plurality of first planetary gears 113 meshed with the first sun gear 111, and a first ring gear 117 meshed with the first planetary gears 113.

The double planetary gear part 120 has a second sun gear 121, a plurality of second planetary gears 123 meshed with the second sun gear 121, a plurality of third planetary gears 125 meshed with the second planetary gears 123, and a second ring gear 127 meshed with the third planetary gears 125. Particularly, the second planetary gears 123 are integrally formed with the first planetary gears 113 so that they may rotate at the same speed.

A diameter of the first sun gear 111 is smaller than that of the second sun gear 121. A diameter of each first planetary gear 113 is larger than that of each second planetary gear 123.

The single planetary gear part 110 and the double planetary gear part 120 are installed between the first and second side plates 135 and 136. The first and second planetary-gear-shafts 131 and 132 are arrayed in parallel to each other. In addition, the first and second planetary gears 113 and 123 are journaled on the first planetary-gear-shaft 132 and the third planetary gears 125 are journaled on the second planetary-gear-shaft 132. The first and third planetary gears 113 and 125 are protruded from the planet carrier 130 so as to be meshed with the first and second ring gears 117 and 127, respectively.

Since the first and second planetary gears 113 and 123 are integrally formed and the second planetary gears 123 are meshed with the third planetary gears 125, the number of the first to third planetary gears 113, 123 and 133 is substantially identical to each other.

An inner diameter of the first ring gear 117 is the sum of diameter of the first sun gear 111 and diameters of two first planetary gears 113. That is, sizes of three components of the single planetary gear part 110 are related to each other so that a size of each component of the single planetary gear part 110 cannot be independently adjusted. However, the size of the second ring gear 127 can be independently adjusted. The third planetary gears 125 are idle gears, which do not directly affect an influence to a gear ratio, so that the diameters of the third planetary gears 125 are not limited to a predetermined value. Accordingly, although it is difficult to make the inner diameter of the second ring gear 127 smaller than that of the first ring gear 117, it is easy to make the inner diameter of the second ring gear 127 larger than that of the first ring gear 117. In view of spatial arrangement and manufacturing costs, the first and second ring gears 117 and 127 are preferred to have the same size. However, it is also possible to form the first and second ring gears 117 and 127 in different sizes.

In order to apply the compound planetary gear set 100 to a gear train of an automatic transmission, torque input is made through the first sun gear 111 while torque output is made through the second sun gear 121 and/or the planet carrier 130.

When four friction elements are attached to the compound planetary gear set 100 as a minimum of basic control elements, input speed can be changed into four forward-speeds and one reverse-speed.

When the first ring gear 117 does not rotate, a first forward-speed is generated through the planet carrier 130 and a third forward-speed ratio is generated through the second sun gear 121. When the second ring gear 127 does not rotate, a reverse-speed is generated through the planet carrier 130 and a second forward-speed is generated through the second sun gear 121. When any two among five components including the first sun gear 111, the second sun gear 121, the planet carrier 130, the first ring gear 117 and the second ring gear 127 are engaged with each other, the compound planetary gear set 100 rotates as a whole at the same speed as the input speed. That is, a direct drive is carried out.

As described above, a gear train capable of generating four forward-speeds and one reverse-speed can be achieved by attaching only four friction elements to the compound planetary gear set 100.

Hereinafter, the gear trains for automatic transmissions including the compound planetary gear set according to the exemplary embodiments of the present invention will be described in detail with reference to the accompanying drawings. However, scopes of the present invention are not limited to the exemplary embodiments described below.

Embodiment 1

FIG. 3 is a partially sectional view showing a gear train of an automatic transmission having a compound planetary gear set 200 according to a first embodiment of the present invention.

Since structure of the compound planetary gear set 200 is identical to the structure of the compound planetary gear set 100, the following description will be made in relation to a process for generating various speeds using four friction elements attached to the compound planetary gear set 200.

Although FIG. 3 shows a torque converter TC aligned between an engine E and an input shaft 201, such a torque converter TC is not necessarily required for the present invention. Instead of the torque converter TC, an electromagnetic clutch or an automatic friction clutch may be employed.

Four friction elements include first and second brakes 241 and 242, and first and second clutches 251 and 252. The first brake 241 selectively brakes a first ring gear 217, and the second brake 242 selectively brakes a second ring gear 227. The first clutch 251 selectively couples a planet carrier 230 with an output shaft 209, and the second clutch 252 selectively couples a second sun gear 221 with the output shaft 209.

Power converted through the torque converter TC is transmitted to a first sun gear 211 through the input shaft 201. Thus, the first sun gear 211 is rotated so that first planetary gears 213 meshed with the first sun gear 211 also rotate. In addition, second planetary gears 223 integrally formed with the first planetary gears 213 also rotate together with the first planetary gears 213 at the same speed. Since a diameter of the second sun gear 221 is greater than that of the first sun gear 211, the second sun gear 221 rotates slower than the first sun gear 211. However, when the compound planetary gear set 200 rotates as a whole, the second sun gear 221 rotates together with the first sun gear 211 at the same speed.

When the first sun gear 211 rotates, the first planetary gears 213 rotate in a direction opposite to a rotational direction of the first sun gear 211 while moving along inner circumference of the first ring gear 217, thereby rotating the first ring gear 217 in a direction opposite to the rotational direction of the first sun gear 211 (hereinafter, the rotational direction of the sun gear 211 is simply referred to as positive direction). However, when the first brake 241 anchors the first ring gear 217 to a transmission case, the first planetary gears 213 move around the first sun gear 211 along the inner circumference of the first ring gear 217 without rotating the first ring gear 217. Here, the planet carrier 230 rotates in accordance with the movement of the first planetary gears 213.

Since the first ring gear 217 has the inner diameter much greater than that of the first planetary gears 213, the rotational speed of the planet carrier 230 substantially identical to the moving speed of the first planetary gears 213 is quite slower than the rotational speed of the first sun gear 211.

On the other hand, the second planetary gears 223 move around the second sun gear 221 along with the planet carrier 230 while being rotated in a direction opposite to the rotational direction of the first sun gear 211. Accordingly, the second sun gear 221 rotates in the forward direction. Here, the rotational speed of the second sun gear 221 is faster than that of the planet carrier 230, but slower than that of the first sun gear 211. Hereinafter, the direction opposite to the rotational direction of the first sun gear 211 is simply referred to as a negative direction.

As described above, when the first ring gear 217 is anchored by means of the first brake 241 and the planet carrier 230 is coupled with the output shaft 209 by means of the first clutch 251, a first forward-speed is provided. On the other hand, when the second sun gear 221 is coupled with the output shaft 209 by means of the second clutch 252 with the first clutch 251 released, a third forward-speed is provided.

When the first planetary gears 213 rotate in the negative direction due to a rotation of the first sun gear 211, the second planetary gears 233 rotate in the negative direction so that the third planetary gears 225 rotate in the positive direction. Since the second ring gear 227 is an internal gear, the second ring gear 227 rotates in the same direction as the rotational direction of the third planetary gears 225. Thus, when the second ring gear 227 is anchored to the transmission case by the second brake 242 with the first brake 241 released, the third planetary gears 225 move along the inner circumference of the second ring gear in the negative direction so that the planet carrier 230 rotates in the negative direction. On the other hand, the second planetary gears 223 move along with the planet carrier 230 in the negative direction while rotating also in the negative direction. Accordingly, the second planetary gears 223 rotate the second sun gear 221 in the positive direction. However, the rotational speed of the second sun gear 221 derived from the operation of the second brake 242 is lower than that of the second sun gear 221 derived from the operation of the first brake 241, but faster than that of the planet carrier 230.

As described above, when the second ring gear 227 is anchored by means of the second brake 242 and the planet carrier 230 is coupled with the output shaft 209 by means of the first clutch 251, a reverse speed is provided. In contrast, when the second sun gear 221 is coupled with the output shaft 209 by means of the second clutch 252 with the first clutch 251 released, a second forward-speed is provided.

In short, the first and third forward-speeds are generated by the operation of the first brake 241, and the second forward-speed and the reverse speed are generated by the operation of the second brake 242.

When the first and second clutches 251 and 252 are simultaneously operated while the first and second brakes 241 and 242 remain released, the planet carrier 230 and the second sun gear 221 are simultaneously coupled with the output shaft 209 so that they rotate at the same rotational speed. Thus, the compound planetary gear set 200 rotates at the same rotational speed as that of the input shaft 201. This direct drive mode makes the fourth forward-speed.

Table 1 shows an operational relationship between the gear steps and the control elements.

TABLE 1

| Gear steps | Brake | | Clutch | | Output element |
|---|---|---|---|---|---|
| | First | Second | First | Second | |
| Park | — | — | O | — | — |
| Reverse | — | O | O | — | Planet carrier |
| Neutral | — | — | O | — | — |
| Forward first | O | — | O | — | Planet carrier |
| Forward second | — | O | — | O | Second sun gear |
| Forward third | O | — | — | O | Second sun gear |
| Forward fourth | — | — | O | O | Planet carrier & second sun gear |

Herein, "O" means an operating state.

Conventional gear trains of the automatic transmission providing four forward-speeds and one reverse-speed have structures different from each other. Such conventional gear trains have a greater number of control elements than the number of gear steps. Among those conventional gear trains, some gear trains include one compound planetary gear set and one simple planetary gear set. Even the simplest gear trains include one compound planetary gear set and five friction elements as control members.

The gear train of the automatic transmission according to the first embodiment of the present invention includes one compound planetary gear set and only four friction elements as control members so that the gear train of the present embodiment has a simplest structure as compared with the structure of the conventional gear trains.

The compound planetary gear set 200 utilized for this embodiment has been invented mainly for generating four forward-speeds with uniform step ratios. However, when the compound planetary gear set 200 is utilized to compose a gear train providing only four forward-speeds, uniform step ratios may not be suitable for passenger cars.

Table 2 shows the number of teeth of each gear provided in the compound planetary gear set 200 allowing the gear train of the present embodiment adaptable for the four-speed transmission.

TABLE 2

| Gear & Application | Aa | Si | Ar | So | Pi | Po |
|---|---|---|---|---|---|---|
| A-1 | 65 | 25 | 70 | 30 | 20 | 15 |
| A-2 | 72 | 26 | 76 | 32 | 23 | 17 |
| A-3 | 70 | 24 | 72 | 30 | 23 | 17 |
| A-4 | 68 | 22 | 68 | 28 | 23 | 17 |
| A-5 | 73 | 23 | 73 | 30 | 25 | 18 |

(Wherein, Aa: first ring gear 217, Si: first sun gear 211, Ar: second ring gear 227, So: second sun gear 221, Pi: first planetary gear 213, Po: second planetary gear 223, Aa = Si + 2 Pi, and Si + Pi = So + Po).

The reduction ratio of each gear step is determined according to a combination of teeth of gears represented in table 2. The reduction ratio is calculated according to the following equation 1.

[Equation 1]

Forward first-speed ratio =
$$1 + \frac{Aa}{Si};$$

Forward second-speed ratio =
$$\frac{\frac{Pi}{Si} \times \frac{Ar}{Po} - 1}{\frac{Ar}{So} - 1}$$

Forward third-speed ratio =
$$\frac{\frac{Aa}{Si} + 1}{\frac{Aa}{Pi} \times \frac{Po}{So} + 1}$$

Forward fourth-speed ratio = 1.000

Reverse speed ratio =
$$\frac{Pi}{Si} \times \frac{Ar}{Po} - 1$$

Table 3 shows the reduction ratio of each gear step obtained by applying the number of gear teeth represented in table 2 to equation 1.

TABLE 3

| | Application & Gear step (step ratio) | | | | |
|---|---|---|---|---|---|
| | A-1 | A-2 | A-3 | A-4 | A-5 |
| Forward first | 3.600 | 3.769 | 3.917 | 4.091 | 4.174 |
| Forward second | 2.050 | 2.149 | 2.185 | 2.227 | 2.308 |
| Forward third | 1.371 | 1.415 | 1.438 | 1.464 | 1.437 |

TABLE 3-continued

| | Application & Gear step (step ratio) | | | | |
|---|---|---|---|---|---|
| | A-1 | A-2 | A-3 | A-4 | A-5 |
| Forward fourth | 1.000 | 1.000 | 1.000 | 1.000 | 1.000 |
| (First/second) | (1.756) | (1.754) | (1.793) | (1.837) | (1.808) |
| (Second/third) | (1.495) | (1.519) | (1.519) | (1.521) | (1.606) |
| (Third/fourth) | (1.371) | (1.415) | (1.438) | (1.464) | (1.437) |
| Reverse | 2.733 | 2.955 | 3.059 | 3.182 | 3.308 |

(Wherein, A1 to A5 shown in table 3 are identical to those of table 2)

Applications of A1 to A5 shown in table 3 have reduction range values, which are obtained by dividing reduction ratio of the lowest gear step by reduction gear ratio of the highest gear step, in a range about 3.6 to 4.174. Such reduction range values and the step ratios are similar to the gear reduction range values (about 4) and the step ratios of currently available automatic transmissions providing four forward-speeds.

As described above, the gear train according to the present invention has a smaller number of friction elements as compared with the conventional gear trains having the simplest structure. The structure of the gear train including one compound planetary gear set and four friction elements is not more complicated than a simple structure of the conventional gear trains providing three-speeds so that an economic automatic transmission capable of providing four-speeds may be achieved when the gear train of the present invention is applied to the four-speed automatic transmission.

Embodiment 2

FIG. 4 is a partially sectional view showing a gear train of an automatic transmission according to a second embodiment of the present invention.

Referring to FIG. 4, the gear train according to the second embodiment of the present invention includes an input shaft 301 connecting a turbine of a torque converter with a first sun gear 311, a compound planetary gear set 300, a first brake 341, a second brake 342, a first clutch 351, a second clutch 352, a first one-way clutch 355, a second one-way clutch 356 and an output shaft 309.

According to the second embodiment of the present invention, two one-way clutches are added to the gear train of the first embodiment, thereby softening the gear shift shock and partially reducing operational frequency of some friction elements. Since it is unnecessary to control two one-way clutches by using an external system, such two one-way clutches do not impose a burden to a control system of the automatic transmission, but the length and weight of the automatic transmission may be increased due to the one-way clutches.

The first one-way clutch 355 and the second brake 342 are positioned in parallel between the transmission case and the second ring gear 327. The second one-way clutch 356 and the first clutch 351 are positioned in parallel between the output shaft 309 and a planet carrier 330.

The first one-way clutch 355 allows the second ring gear 327 rotate in the positive direction while restricting a rotation of the second ring gear 327 in the negative direction. The second one-way clutch 356 allows the output shaft 309 rotate faster than the planet carrier 330, while preventing the output shaft 309 from rotating slower than the planet carrier 330.

Referring to FIG. 3 showing the first embodiment of the present invention, in order to generate the first forward-speed, the first brake is operated to make the planet carrier 230 rotate at a low speed and the first clutch 251 is actuated to make the planet carrier 230 transmit output torque to the output shaft 209.

Referring to FIG. 4 showing the second embodiment of the present invention, when the planet carrier 330 rotates at a low speed due to an operation of the first brake 341, the second one-way clutch 356 is locked and the output shaft 309 rotates together with the planet carrier 330, even if the first clutch 351 does not operate. Thus, the first forward-speed can be provided by operating only the first brake 341.

According to the first embodiment, in order to generate the second forward-speed, the second brake 242 is operated to make the second sun gear 221 rotate at moderate speed and the second clutch 252 is actuated to make the second sun gear 221 transmit output torque to the output shaft 209.

However, according to the second embodiment of the present invention, when the second sun gear 321 is coupled with the output shaft 309 by the second clutch 352, the first one-way clutch 355 is locked preventing the second ring gear 327 from rotating in the negative direction, thereby providing the second forward-speed.

When a car travels down along an inclined road requiring an engine brake with first forward-speed, the output shaft 309 becomes to rotate faster than the planet carrier 330. Thus, the second one-way clutch 356 is released so that the engine idles and the car is accelerated. In this case, the first clutch 351 must be operated in order that the planet carrier 330 may be forcibly coupled with the output shaft 309 to effect an engine brake.

The operation of the second brake 342 and the first clutch 351 for generating the reverse speed is identical to that of the first embodiment. In addition, the operation of the first brake 341 and the second clutch 352 for providing the third forward-speed and the operation of the first and second clutches 351 and 352 for providing the fourth forward-speed are substantially identical to those of the first embodiment.

According to the first embodiment of the present invention, when the gear is shifted from the first forward-speed to the second forward-speed, the first brake 241 and the first clutch 251 are simultaneously released and the second brake 242 and the second clutch 252 are simultaneously operated. However, according to the second embodiment of the present invention, only the second clutch 352 is operated while the first brake 341 is released.

When a plurality of friction elements are simultaneously operated or released, an operational discrepancy may occur between friction elements. So reducing the number of friction elements to be operated or released softens the shift shock. The gear shift shock of the second embodiment will be softer than that of the first embodiment when the gear is shifted from the first forward-speed to the second forward-speed. When the gear is shifted from the second forward-speed to the third forward-speed, the first brake 241 must be operated while releasing the second brake 242 in the first embodiment. However, according to the second embodiment of the present invention, the first brake 341 is only operated without releasing the second brake 342 so that the gear shift shock may be softer as compared with that of the first embodiment.

Due to the role of the first one-way clutch 355, the second brake 342 is operated when a car travels in the reverse direction or when engine brake is required at the second forward-speed. Thus, the second brake 342 is not required to operate when the car travels along a flat road. Due to the role of the second one-way clutch 356, the first clutch 351 is only operated when the car travels in the reverse direction, when the engine brake is required at the first forward-speed or when the vehicle travels at the fourth forward-speed. Accordingly, when driving a car repeating stop-and-go, frequency of the use of the first clutch 351 will be remarkably reduced.

According to the first embodiment of the present invention, when the selector lever is in parking position or in neutral position, the first clutch 251 is operated so as to be prepared for shifting to the first forward-speed or to the reverse speed. However, according to the second embodiment of the present invention, since it is not necessary to operate the first clutch 251 at the first forward-speed, no friction element is operated when the selector lever is in parking position or in neutral position. The relationship between the gear steps and operation of the friction elements is shown in table 4.

TABLE 4

| Gear step | Brake 1st | Brake 2nd | Clutch 1st | Clutch 2nd | One-way clutch 1st | One-way clutch 2nd | Output element |
|---|---|---|---|---|---|---|---|
| Park | — | — | — | — | — | — | — |
| Reverse | — | O | O | — | — | — | Planet carrier |
| Neutral | — | — | — | — | — | — | — |
| Forward first | O | — | — | — | — | L | Planet carrier |
| (Forward first) | O | — | O | — | — | — | Planet carrier |
| Forward second | — | — | — | O | L | — | Second sun gear |
| (Forward second) | — | O | — | O | — | — | Second sun gear |
| Forward third | O | — | — | O | — | — | Second sun gear |
| Forward fourth | — | — | O | O | — | — | Planet carrier & second sun gear |

In table 4, ( ) is for effecting an engine brake, O means an operating state and L means a locking state.

Here, tables 2 and 3 as well as equation 1 represented in the first embodiment can be applied to the second embodiment of the present invention without any modification.

Embodiment 3

FIG. 5 is a partially sectional view showing a gear train of an automatic transmission according to a third embodiment of the present invention.

Referring to FIG. 5, the gear train according to the third embodiment of the present invention includes an input shaft 401 connected to a torque converter, a simple planetary gear set (hereinafter, simply referred to as SP) 460 connected to the input shaft 401, a compound planetary gear set 400 connected to the SP gear set 460, and an output shaft 409 connected to the compound planetary gear set 400.

The compound planetary gear set 400 is controlled by means of a first brake 441, a second brake 442, a first clutch 451 and a second clutch 452. Since the structure and gear shift functioning of the compound planetary gear set 400 are substantially identical to those of the compound planetary gear set of the first embodiment, they will not be further described below.

The SP gear set 460 has an SP sun gear 461, a plurality of SP planetary gears 463 meshed with the SP sun gear 461, an SP ring gear 467 meshed with the SP planetary gears 463, and an SP carrier 433 supporting the SP planetary gears 463 such that the SP gears 463 move around the SP sun gear 461.

Although an SP clutch 453 is arranged between the input shaft 401 and the SP sun gear 461, the present invention is not limited to such arrangement. The role of the SP clutch 453 is for transmitting power to the compound planetary gear set 400 without speed change by having the SP gear set 460 in direct drive state, so the SP clutch 453 may be positioned between any two of three components (that is, the SP sun gear 461, the SP carrier 433 and the SP ring gear 467) of the SP gear set 460. In addition, the SP clutch 453 may be installed between the input shaft 401 and an intermediate shaft 405.

Torque converted through the torque converter TC is transmitted to the SP carrier 433 through the input shaft 401. When the SP clutch 453 arranged between the input shaft 401 and the SP sun gear 461 operates, the SP carrier 433 rotates together with the SP sun gear 461 so that the SP gear set 460 rotates as a whole at the same speed as that of the input shaft 401. That is, as the SP clutch 453 operates, the SP gear set 460 is in direct drive mode so that unchanged input torque may be transmitted to the first sun gear 411 through the intermediate shaft 405.

When the SP brake 443 operates with the SP clutch 453 released, the SP sun gear 461 is anchored to a transmission case. When the sun gear 461 does not rotate, the SP planetary gears 463 move in the positive direction while rotating in the positive direction. As the SP planetary gears 463 move in the positive direction, the SP ring gear 467 rotates in the positive direction at a speed faster than that of the SP carrier 433. In other words, as the SP brake 443 operates, the SP ring gear 467 conveys over-drive speed to the first sun gear 411 through the intermediate shaft 405.

As described above, the SP gear set 410 provides either direct drive speed or over-drive speed. When the direct drive speed is provided, input torque of the compound planetary gear set 400 is substantially equal to output torque of the torque converter so that shift functioning of the compound planetary gear set 400 is identical to that of the first embodiment of the present invention. However, when the over-drive speed is provided by the SP gear set 460, input torque transmitted to the first sun gear 411 becomes reduced because the SP gear set 460 rotates faster than the direct drive state. In the over-drive state, an output speed of the compound planetary gear set 400 at each gear step becomes higher than that in the direct drive state by the over-drive ratio.

As described above, the gear steps in the over-drive state are added to the gear steps in the direct drive state, thereby providing eight forward-speed ratios and two reverse-speed ratios.

Accordingly, while the gear is shifted from the first through the forward first-speed to the eighth forward-speed, the SP gear set 460 provides the direct drive speed or the over-drive speed, alternatively. That is, the first forward-speed, the third forward-speed, the fifth forward-speed and the seventh forward-speed are provided in the direct drive state, and the second forward-speed, the fourth forward-speed, the sixth forward-speed and the eighth forward-speed are provided in the over-drive state. In order to make the SP gear set 460 provide the direct drive speed, the SP clutch 453 must be operated and to make the SP gear set 460 provide the over-drive speed, the SP brake 443 must be operated. Thus, the two friction elements are alternately operated.

When a vehicle starts to move from halting position, the gear must be shifted either to the first reverse-step or the first forward-speed. In this case, both of the SP clutch 453 and the first clutch 451 must be operated. Thus, the SP clutch 453 and the first clutch 451 are operated when the selector lever is positioned in parking position or in neutral position to be prepared for start. Since the gear shift is carried out only by the friction elements, the engine brake is effected in every gear step.

Table 5 shows the operational relationship between the friction elements and gear steps.

TABLE 5

| Gear step | Brake | | | Clutch | | | Output element |
|---|---|---|---|---|---|---|---|
| | SP | 1st | 2nd | SP | 1st | 2nd | |
| Parking | — | — | — | O | O | — | — |
| Reverse First-speed | — | — | O | O | O | — | Planet carrier |
| Second-speed | O | — | O | — | O | — | Planet carrier |
| Neutral | — | — | — | O | O | — | — |
| Forward first-speed | — | O | — | O | O | — | Planet carrier |
| Forward second-speed | O | O | — | — | O | — | Planet carrier |
| Forward third-speed | — | — | O | O | — | O | Second sun gear |
| Forward fourth-speed | O | — | O | — | — | O | Second sun gear |
| Forward fifth-speed | — | O | — | O | — | O | Second sun gear |
| Forward sixth-speed | O | O | — | — | — | O | Second sun gear |
| Forward seventh-speed | — | — | — | O | O | O | Planet carrier & Second sun gear |
| Forward eight-speed | O | — | — | — | O | O | Planet carrier & Second sun gear |

Herein, "O" means an operating state.

In order that each of the eight forward-step ratios may be practical enough, a geometrical progression type of gear step system, in which step ratios are uniformly set between gear steps, must be provided by the compound planetary gear set 400 while step ratio of the SP gear set 460 must be nearly identical to the square root of the step ratios between gear steps of the compound planetary gear set 400.

However, there is a restriction about the reduction range in forming such a gear step system with the compound planetary gear set 400. That is, the geometrical progression type gear step system can be composed when the gear reduction range is about 3.8 to 4.7. When forming the geometrical progression type gear step system composed of eight forward-speed ratios, the reduction range thereof is obtained by multiplying the reduction range value (3.6 to 4.7) of the impound planetary gear set 400 by the over-drive ratio (1.25 to 1.30) of the SP gear set 460 so that the resultant reduction range of about 4.8 to 6.1 is realized.

Such reduction ranges may be applicable to passenger cars, light vans and even to some work vehicles.

Table 6 shows combinations of gears in planetary gear sets 400 and 460 for the geometrical progression type gear steps providing eight forward-speed ratios.

Data shown in table 6 are not necessarily required for the practical use of the present invention. In addition, the combination of gears shown in table 6 are not intended to limit embodiments of the geometrical progression type gear steps providing eight forward-speed ratios. Other gear combinations may be used according to the present invention.

TABLE 6

| Gear & Application | As | Ss | Aa | Si | Ar | So | Pi | Po |
|---|---|---|---|---|---|---|---|---|
| B-1 | 76 | 20 | 71 | 25 | 79 | 32 | 23 | 16 |
| B-2 | 71 | 19 | 70 | 24 | 76 | 31 | 23 | 16 |
| B-3 | 66 | 18 | 76 | 24 | 78 | 32 | 26 | 18 |
| B-4 | 75 | 21 | 80 | 24 | 85 | 33 | 28 | 19 |
| B-5 | 73 | 21 | 73 | 21 | 71 | 29 | 26 | 18 |
| B-6 | 69 | 21 | 77 | 21 | 76 | 30 | 28 | 19 |

*Wherein, As: SP ring gear 467, Ss: SP sun gear 461, Aa: first ring gear 417, Si: first sun gear 411, Ar: second ring gear 427, So: second sun gear 421, Pi: first planetary gear 413, Po: second planetary gear 423, Aa = Si + 2 Pi, and Si + Pi = So + Po.

The reduction ratio of each gear step is calculated with numerals shown in table 6 through the following equation 2.

$$\text{Forward first-speed ratio} = 1 + \frac{Aa}{Si};$$ [Equation 2]

$$\text{Forward second-speed ratio} = \text{forward first-speed ratio} \times Rod,$$

$$\text{Forward third-speed ratio} = \frac{\frac{Pi}{Si} \times \frac{Ar}{Po} - 1}{\frac{Ar}{So} - 1}$$

$$\text{Forward fourth-speed ratio} = \text{forward third-speed ratio} \times Rod,$$

$$\text{Forward fifth-speed ratio} = \frac{\frac{Aa}{Si} + 1}{\frac{Aa}{Pi} \times \frac{Po}{So} + 1}$$

$$\text{Forward sixth-speed ratio} = \text{forward fifth-speed ratio} \times Rod,$$

$$\text{Forward seventh-speed ratio} = 1.000,$$

$$\text{Forward eighth-speed ratio} = Rod,$$

$$\text{Reverse first-speed ratio} = \frac{Pi}{Si} \times \frac{Ar}{Po} - 1$$

$$\text{Reverse second-speed ratio} = \text{reverse first-speed ratio} \times Rod.$$

Wherein, $$Rod = \frac{\frac{As}{Ss}}{\frac{As}{Ss} + 1}$$

-continued (reciprocal of over-drive ratio), $$Aa = Si + 2Pi;$$

$$Si + Pi = So + Po$$

The reduction ratio of each gear step can be obtained by applying the number of gear teeth to above equation 2. Table 7 shows the reduction ratio of each gear step.

TABLE 7

| | Application & Gear step (step ratio) | | | | | |
|---|---|---|---|---|---|---|
| | B-1 | B-2 | B-3 | B-4 | B-5 | B-6 |
| Forward first | 3.840 | 3.917 | 4.167 | 4.333 | 4.476 | 4.667 |
| Forward second | 3.040 | 3.090 | 3.274 | 3.385 | 3.475 | 3.579 |
| Forward third | 2.412 | 2.447 | 2.570 | 2.677 | 2.682 | 2.826 |
| Forward fourth | 1.910 | 1.930 | 2.019 | 2.091 | 2.082 | 2.167 |
| Forward fifth | 1.510 | 1.524 | 1.576 | 1.638 | 1.632 | 1.702 |
| Forward sixth | 1.196 | 1.202 | 1.238 | 1.280 | 1.267 | 1.305 |
| Forward seventh | 1.000 | 1.000 | 1.000 | 1.000 | 1.000 | 1.000 |
| Forward eighth | 0.792 | 0.789 | 0.786 | 0.781 | 0.777 | 0.767 |
| Forward (first/second) | (1.263) | (1.268) | (1.273) | (1.280) | (1.288) | (1.304) |
| Forward (second/third) | (1.260) | (1.263) | (1.273) | (1.264) | (1.296) | (1.266) |
| Forward (third/fourth) | (1.263) | (1.268) | (1.273) | (1.280) | (1.288) | (1.304) |
| Forward (fourth/fifth) | (1.265) | (1.266) | (1.281) | (1.277) | (1.276) | (1.273) |
| Forward (fifth/sixth) | (1.263) | (1.268) | (1.273) | (1.280) | (1.288) | (1.304) |
| Forward (sixth/seventh) | (1.196) | (1.202) | (1.238) | (1.280) | (1.267) | (1.305) |
| Forward (seventh/eighth) | (1.263) | (1.268) | (1.273) | (1.280) | (1.288) | (1.304) |
| Reverse first | 3.543 | 3.552 | 3.694 | 4.219 | 3.884 | 4.333 |
| Reverse second | 2.805 | 2.801 | 2.902 | 3.296 | 3.016 | 3.322 |
| Reverse (first/second) | (1.263) | (1.268) | (1.273) | (1.280) | (1.288) | (1.304) |

Referring to table 7, applications of B-1 to B-5 have reduction ranges of about 4.86 to 6.08. Such reduction ranges are quite suitable for most of automobiles.

The gear train of the present embodiment has small step ratios, particularly, between lower gear steps as compared with step ratios of the conventional gear trains. Thus, when driving a car in crowded cities or congested roads where the vehicle repeats stop-and-go, engine RPM can be maintained low so that fuel consumption may be much reduced. When a car is driven rather steadily at low or moderate speed, it is also possible to lower the engine RPM by selecting more proper gear step suitable for the traveling condition so that fuel economy of the car can be much improved as compared with cars equipped with conventional transmissions.

The gear train of the present embodiment has a relatively simple structure including one compound planetary gear set 400, one SP gear set 460 coupled with the compound planetary gear set 400, and six friction elements only as control members.

Moreover, the gear train of the present embodiment can provide eight forward-speeds and has a less number of friction elements as compared with a simplest conventional five-speed gear train. Therefore, the gear train of the present embodiment may be utilized for transmissions providing five-speeds or six-speeds. The gear train of the present embodiment also can be used for a transmission providing seven-speeds by simply omitting the second forward-speed shown in table 7. However, when the gear train of the present embodiment is used for transmissions providing five-speeds or six-speeds, it may be necessary to adjust step ratios between the gear steps to be similar to the step ratios of the conventional transmission, in which the step ratios between gear steps become smaller at higher gear steps than at lower gear steps.

Although the gear train of the present embodiment is designed mainly for the geometric progression type transmission providing eight-speed ratios, the gear train can be easily utilized for the above applications. When the gear train is used for a five-speed transmission, each gear of the compound planetary gear set 400 may have same teeth as those of table 2 represented in the first embodiment. Then, when the SP gear set 460 generates direct drive speed, the five-speed transmission provides first to fourth-speeds and first reverse-speed in accordance with table 3 represented in the first embodiment. When the SP gear set 460 generates over-drive speed while the compound planetary gear set 400 is maintained to generate its fourth speed, the fifth forward-speed is provided. Since the over-drive ratio of the SP gear set 460 does not exert an influence on the first to fourth forward-speeds and the first reverse-speed, the over dive ratio of the SP gear set 460 can be freely determined.

Table 8 shows an operational relationship between the gear steps and the friction elements when the gear train of the present embodiment is utilized for a five-speed transmission.

TABLE 8

| | Brake | | | Clutch | | | Output |
|---|---|---|---|---|---|---|---|
| Gear step | SP | 1st | 2nd | SP | 1st | 2nd | element |
| Parking | — | — | — | O | O | — | — |
| Reverse 1st | — | — | O | O | O | — | Planet carrier |
| 2nd | O | — | O | — | O | — | Planet carrier |
| Neutral | — | — | — | O | O | — | — |
| Forward first | — | O | — | O | O | — | Planet carrier |
| Forward second | — | — | O | O | — | O | Second sun gear |
| Forward third | — | O | — | O | — | O | Second sun gear |
| Forward fourth | — | — | — | O | O | O | Planet carrier & second sun gear |
| Forward fifth | O | — | — | — | O | O | Planet carrier & second sun gear |

Herein, "O" means an operating state.

Table 9 shows teeth of each gear of the compound planetary gear set 400 identical to those of table 2 represented in the first embodiment 1 and teeth of the SP gear set 460 added thereto.

TABLE 9

| Gear & Application | As | Ss | Aa | Si | Ar | So | Pi | Po |
|---|---|---|---|---|---|---|---|---|
| C-1 | 76 | 20 | 65 | 25 | 70 | 30 | 20 | 15 |
| C-2 | 71 | 19 | 72 | 26 | 76 | 32 | 23 | 17 |
| C-3 | 66 | 18 | 70 | 24 | 72 | 30 | 23 | 17 |
| C-4 | 75 | 21 | 68 | 22 | 68 | 28 | 23 | 17 |
| C-5 | 73 | 21 | 73 | 23 | 73 | 30 | 25 | 18 |

Herein, gears shown in table 9 are identical to gears shown in table 6.
*Aa = Si + 2Pi, Si + Pi = So + Po The reduction ratio in each gear step according to the number of gear teeth shown in table 9 is calculated through following equation 3.

[Equation 3]

Forward first-speed ratio = 
$$1 + \frac{Aa}{Si};$$

Forward second-speed ratio =
$$\frac{\frac{Pi}{Si} \times \frac{Ar}{Po} - 1}{\frac{Ar}{So} - 1}$$

Forward third-speed ratio =
$$\frac{\frac{Aa}{Si} + 1}{\frac{Aa}{Pi} \times \frac{Po}{So} + 1}$$

Forward fourth-speed ratio = 1,000,

Forward fifth-speed ratio = Rod,

Reverse first-speed ratio =
$$\frac{Pi}{Si} \times \frac{Ar}{Po} - 1$$

Reverse second-speed ratio = reverse first-speed ratio × Rod.

Wherein,
$$Rod = \frac{\frac{As}{Ss}}{\frac{As}{Ss} + 1}$$

(reciprocal of over-drive ratio).

The reduction ratio of each gear step can be obtained by applying the number of gear teeth shown in table 9 to equation 3. Table 10 shows the reduction ratio of each gear step.

TABLE 10

| | Application & Gear steps (step ratio) | | | | |
|---|---|---|---|---|---|
| | C-1 | C-2 | C-3 | C-4 | C-5 |
| Forward first | 3.600 | 3.769 | 3.917 | 4.091 | 4.174 |
| Forward second | 2.050 | 2.149 | 2.185 | 2.227 | 2.308 |

TABLE 10-continued

| | Application & Gear steps (step ratio) | | | | |
|---|---|---|---|---|---|
| | C-1 | C-2 | C-3 | C-4 | C-5 |
| Forward third | 1.371 | 1.415 | 1.438 | 1.464 | 1.437 |
| Forward fourth | 1.000 | 1.000 | 1.000 | 1.000 | 1.000 |
| Forward sixth | 0.792 | 0.789 | 0.786 | 0.781 | 0.777 |
| Forward(first/second) | (1.756) | (1.754) | (1.793) | (1.837) | (1.808) |
| Forward(second/third) | (1.495) | (1.519) | (1.519) | (1.521) | (1.606) |
| Forward(third/fourth) | (1.371) | (1.415) | (1.438) | (1.464) | (1.437) |
| Forward(fourth/fifth) | (1.263) | (1.268) | (1.273) | (1.280) | (1.288) |
| Reverse first | 2.733 | 2.955 | 3.059 | 3.182 | 3.308 |
| Reverse second | 2.165 | 2.331 | 2.404 | 2.485 | 2.570 |
| Reverse (first/second) | (1.263) | (1.268) | (1.273) | (1.280) | (1.288) |

Referring to table 10, reduction ranges of the above applications are about 4.55 to 5.38, which are similar to currently available five-speed transmissions. In addition, the step ratios between the gear steps are harmoniously formed so that the gear train of the present embodiment may be satisfactorily applicable for a transmission providing five-speed ratios.

Table 11 shows the operational relationship between gear steps and control elements when the gear train of the present embodiment is utilized for a transmission providing six-speed ratios.

TABLE 11

| | Brake | | | Clutch | | | Output |
|---|---|---|---|---|---|---|---|
| Gear step | SP | 1$^{st}$ | 2$^{nd}$ | SP | 1$^{st}$ | 2$^{nd}$ | element |
| Parking | — | — | — | O | O | — | — |
| Reverse 1$^{st}$ | — | — | O | O | O | — | Planet carrier |
| 2$^{nd}$ | O | — | O | — | O | — | Planet carrier |
| Neutral | — | — | — | O | O | — | — |
| Forward first | — | O | — | O | O | — | Planet carrier |
| Forward second | — | — | O | O | — | O | Second sun gear |
| Forward third | — | O | — | O | — | O | Second sun gear |
| Forward fourth | O | O | — | — | — | O | Second sun gear |
| Forward fifth | — | — | — | O | O | O | Planet carrier & Second sun gear |
| Forward sixth | O | — | — | — | O | O | Planet carrier & Second sun gear |

Herein, "O" means an operating state.

Table 12 shows combinations of gear teeth for generating reduction ratios applicable for six-speed transmissions.

TABLE 12

| Gear & Application | As | Ss | Aa | Si | Ar | So | Pi | Po |
|---|---|---|---|---|---|---|---|---|
| D-1 | 72 | 18 | 74 | 24 | 77 | 31 | 25 | 18 |
| D-2 | 76 | 20 | 69 | 21 | 72 | 28 | 24 | 17 |
| D-3 | 75 | 21 | 73 | 21 | 75 | 29 | 26 | 18 |
| D-4 | 66 | 18 | 75 | 21 | 75 | 29 | 27 | 19 |
| D-5 | 66 | 18 | 66 | 18 | 65 | 25 | 24 | 17 |

* Herein, gears shown in table 12 are identical to gears shown in table 6.
* Aa = Si + 2Pi, Si + Pi = So + Po The reduction ratio of each gear step according to the number of gear teeth shown in table 12 is calculated through following equation 4.

$$\text{Forward first-speed ratio} = 1 + \frac{Aa}{Si};$$ [Equation 4]

$$\text{Forward second-speed ratio} = \frac{\frac{Pi}{Si} \times \frac{Ar}{Po} - 1}{\frac{Ar}{So} - 1}$$

$$\text{Forward third-speed ratio} = \frac{\frac{Aa}{Si} + 1}{\frac{Aa}{Pi} \times \frac{Po}{So} + 1}$$

Forward fourth-speed ratio = forward third-speed ratio × Rod,

Forward fifth-speed ratio = 1,000,

Forward sixth-speed ratio = Rod, $$\text{Reverse first-speed ratio} = \frac{Pi}{Si} \times \frac{Ar}{Po} - 1$$

Reverse second-speed ratio = reverse first-speed ratio × Rod.

Wherein, $$Rod = \frac{\frac{As}{Ss}}{\frac{As}{Ss} + 1}$$

(reciprocal of over-drive ratio).

The reduction ratio of each gear step can be obtained by applying the number of gear teeth shown in table 12 to equation 4. Table 13 shows the reduction ratio of each gear step.

TABLE 13

| | Application & Gear step (step ratio) | | | | |
|---|---|---|---|---|---|
| | D-1 | D-2 | D-3 | D-4 | D-5 |
| Forward first | 4.083 | 4.286 | 4.476 | 4.571 | 4.667 |
| Forward second | 2.329 | 2.444 | 2.622 | 2.569 | 2.561 |
| Forward third | 1.502 | 1.561 | 1.632 | 1.621 | 1.626 |
| Forward fourth | 1.202 | 1.236 | 1.275 | 1.273 | 1.277 |
| Forward fifth | 1.000 | 1.000 | 1.000 | 1.000 | 1.000 |
| Forward sixth | 0.800 | 0.792 | 0.781 | 0.786 | 0.786 |
| Forward(first/second) | (1.753) | (1.754) | (1.707) | (1.779) | (1.822) |
| Forward(second/third) | (1.551) | (1.566) | (1.607) | (1.585) | (1.575) |
| Forward(third/fourth) | (1.250) | (1.263) | (1.280) | (1.273) | (1.273) |
| Forward(fourth/fifth) | (1.202) | (1.236) | (1.275) | (1.273) | (1.277) |
| Forward(fifth/sixth) | (1.250) | (1.263) | (1.280) | (1.273) | (1.273) |
| Reverse first | 3.456 | 3.840 | 4.159 | 4.075 | 4.098 |
| Reverse second | 2.765 | 3.040 | 3.249 | 3.201 | 3.219 |
| Reverse(first/second) | (1.250) | (1.263) | (1.280) | (1.273) | (1.273) |

As shown in table 13, reduction ranges of the above applications are about 5.10 to 5.94 expanded by more than 10% as compared with reduction ranges of the applications for the five-speed transmission shown in table 11. The step ratios between the gear steps are properly formed so that the gear train of the present embodiment may be satisfactorily applicable for the transmission providing six speed ratios.

As described above, the gear train of the present embodiment can provide eight forward-speeds and two reverse-speeds in maximum. Particularly, when the gear train is used for an eight-speed transmission, uniform step ratios can be formed so that overall fuel economy may be improved. In particular, fuel economy may be remarkably improved when a car travels at low or moderate speed. Moreover, the gear train of the present embodiment is adaptable for the transmissions providing five-speed ratios or six-speed ratios.

Meanwhile, since the gear train has a structure including one compound planetary gear set, one SP gear set and six friction elements, the gear train may be manufactured at low cost near to that required for manufacturing conventional five-speed transmissions or four-speed transmissions with complicated structure.

Embodiment 4

FIG. 6 is a partially sectional view showing a gear train of an automatic transmission according to a fourth embodiment of the present invention.

The present embodiment is similar to the third embodiment except for an arrangement order of an SP gear set and a compound planetary gear set. In the third embodiment of the present invention, the SP gear set 460 is positioned between the torque converter TC and the compound planetary gear set 400. On the contrary, in the present embodiment, a compound planetary gear set 500 is connected to the torque converter TC, and an SP gear set 570 is positioned between the compound planetary gear set 500 and an output shaft 509.

Referring to FIG. 6, the gear train according to the fourth embodiment of the present invention includes an input shaft 501 for connecting a turbine of a torque converter to a first sun gear 511, the compound planetary gear set 500 connected to the input shaft 501, the SP gear set 570 connected to the compound planetary gear set 500 through an intermediate shaft 505, the output shaft 509 connected to the SP gear set 570, three brakes 541 to 543, and three clutches 551 to 553.

According to the present embodiment, torque converted through the torque converter is transmitted to the first sun gear 511 and output torque of the compound planetary gear set 500 is transmitted to an SP carrier 533 through the intermediate shaft 505. Output torque of the gear train is generated from an SP ring gear 577 coupled to the output shaft 509.

Power transmitted to the first sun gear 511 from the torque converter TC is converted into four forward-speed ratios and one reverse-speed ratio by the compound planetary gear set 500 and is transmitted to the SP gear set 570 through the intermediate shaft 505.

When the SP gear set 570 is in direct drive state due to operation of the SP clutch 553, torque is inputted through the SP clutch 553 and the SP sun gear 571 and is transferred to the output shaft 509 through the SP ring gear 577 without conversion. Thus, the first, third, fifth, seventh forward-speeds and the first reverse-speed are provided through the output shaft 509.

When the SP ring gear 571 does not rotate due to operation of the SP brake 543, torque is inputted only through the SP carrier 570, and the SP ring gear 577 transfers increased speed to the output shaft 509. Here, the second, fourth, sixth and eighth forward-speeds and the second reverse-speed are provided.

Table 14 shows operations of control elements in each gear step for having the gear train according to the fourth embodiment of the present invention to provide eight forward-speed ratios and two reverse-speed ratios.

TABLE 14

| Gear step | Brake | | | Clutch | | | Output element |
|---|---|---|---|---|---|---|---|
| | SP | 1st | 2nd | SP | 1st | 2nd | |
| Parking | — | — | — | O | O | — | — |
| Reverse First | — | — | O | O | O | — | SP ring gear |
| Second | O | — | O | — | O | — | SP ring gear |
| Neutral | — | — | — | O | O | — | — |
| Forward first | — | O | — | O | O | — | SP ring gear |
| Forward second | O | O | — | — | O | — | SP ring gear |
| Forward third | — | — | O | O | — | O | SP ring gear |
| Forward fourth | O | — | O | — | — | O | SP ring gear |
| Forward fifth | — | O | — | O | — | O | SP ring gear |
| Forward sixth | O | O | — | — | — | O | SP ring gear |
| Forward seventh | — | — | — | O | O | O | SP ring gear |
| Forward eighth | O | — | — | — | O | O | SP ring gear |

Herein, "O" means an operating state.

Table 14 is identical to table 6 except for the output elements.

Tables 6, 7, 9, 10, 12, and 13 and equations 2, 3 and 4 represented in the third embodiment are applied to the present embodiment and tables 5, 8 and 11 shown in the third embodiment are also applied to the present embodiment when the output elements are replaced by the SP ring gear. Therefore, they will not be further described below.

As described above, the fourth embodiment of the present invention has an operational principle identical to the operational principle of the third embodiment in that the compound planetary gear set 500 is connected to the SP gear set 570 in order that eight forward-speeds and two reverse-speeds may be provided. However, the gear train of the present embodiment has a disadvantage as compared to the gear train of the third embodiment in view of commercialization.

According to the third embodiment of the present invention, the SP gear set 460 receives power from the torque converter TC. However, according to the fourth embodiment of the present invention, torque converted through the compound planetary gear set 500 is inputted into the SP gear set 570. Therefore, the SP gear set 570 of the present embodiment must endure a force greater than that of the third embodiment by around four times. Also, the SP brake 543 and the SP clutch 533 must endure greater force so that the number of friction plates may have to be much increased and the diameter of the intermediate shaft 505 has to be enlarged.

As mentioned above, the gear train according to the fourth embodiment of the present invention is less advantageous than that of the third embodiment in weight and size.

Embodiment 5

FIG. 7 is a partially sectional view showing a gear train of an automatic transmission according to a fifth embodiment of the present invention.

Referring to FIG. 7, the gear train for the automatic transmission according to the fifth embodiment of the present invention includes an input shaft 601 for connecting a torque converter to an SP carrier 633, an SP gear set 660 connected to the input shaft 601, a compound planetary gear set 600 connected to the SP gear set 660 through an intermediate shaft 605, an output shaft 609 selectively coupled with the compound planetary gear set 600, three brakes 641 to 643, three clutches 651 to 653, and three one-way clutches 655 to 657.

According to the gear train of the present embodiment, one-way clutches 655 to 657 are added to the gear train of the third embodiment, in order that gear shift shock may be softened and frequency of engagement of some friction elements may be reduced. However, the weight and length of the gear train may be increased. Since it is unnecessary to control the one-way clutches 655, 656 and 657 by using an external system, the one-way clutches 655, 656 and 657 do not impose a burden to a control system.

Positions and functions of the first and second one-way clutches 655 and 656 are identical to those of the second embodiment of the present invention. That is, the first one-way clutch 655 is positioned in parallel with the second brake 642 between the second ring gear 627 and the transmission case, thereby preventing the second ring gear 627 from rotating in the negative direction. The second one-way clutch 656 is positioned in parallel with the first clutch 651 between the planet carrier 630 and the output shaft 609 in order to prevent the output shaft 609 from rotating slower than the planet carrier 630.

Since the SP one-way clutch 657 is intended to have the SP gear set 669 in direct drive state without operation of the SP clutch 653, the SP one-way clutch 657 is positioned between the input shaft 601 and the SP ring gear 667 or between the input shaft 601 and the intermediate shaft 605.

The SP one-way clutch 657 prevents the SP ring gear 667 or the intermediate shaft 605 from rotating slower than the SP carrier 633 or the input shaft 601. Therefore, when the SP brake 643 remains released, the SP one-way clutch 657 is locked, while the engine E turns, having the SP gear set 660 in direct drive state and the first sun gear 611 rotate at a speed identical to that of a turbine of the torque converter. Due to such a function of the SP one-way clutch 657, engagement of the SP clutch 653 is necessarily required only when engine brake is desired so that frequency of the use of the SP clutch 653 may be remarkably reduced.

As described with reference to the second embodiment of the present invention, the first one-way clutch 655 may reduce the frequency of the use of the second brake 642, and the second one-way clutch 656 may reduce the frequency of the use of the first clutch 651.

Similar to the functions of the first and second one-way clutches 655 and 656, which reduce the frequency of the use of the friction elements 642 and 651, thereby softening gear shift shock, the SP one-way clutch 657 has a function reducing the frequency of the use of the SP clutch 653. Therefore, in the course of ordinary gear shift operation, the control of the SP gear set 660 may be carried out by simply operating or releasing the SP brake 643 only, thereby simplifying gear shift procedure and softening gear shift shock.

According to the fifth embodiment of the present invention, when the selector lever is in parking or in neutral, friction elements must not be operated. This is because the SP one-way clutch 657 is always locked when the engine E turns. In this state, when only the first brake 641 operates, the second one-way clutch 656 is also locked, so that the first forward first-speed is generated.

Table 15 shows the operation of the control elements for allowing the gear train of the fifth embodiment to provide eight forward-speeds and two reverse-speeds.

TABLE 15

| Gear step (Engine brake) | Brake | | | Clutch | | | One-way clutch | | | Output element |
|---|---|---|---|---|---|---|---|---|---|---|
| | SP | 1st | 2nd | SP | 1st | 2nd | SP | 1st | 2nd | |
| Parking | — | — | — | — | — | — | L | — | — | |
| Reverse First | — | — | O | — | O | — | L | — | — | Planet carrier |
| Second | O | — | O | — | O | — | — | — | — | Planet carrier |
| Neutral | — | — | — | — | — | — | L | — | — | |
| Forward first | — | O | — | — | — | — | L | — | L | Planet carrier |
| (Forward first) | — | O | — | O | O | — | — | — | — | Planet carrier |
| Forward second | O | O | — | — | — | — | — | — | L | Planet carrier |
| (Forward second) | O | O | — | — | O | — | — | — | — | Planet carrier |
| Forward third | — | — | — | — | — | O | L | L | — | Second sun gear |
| (Forward third) | — | — | O | O | — | O | — | — | — | Second sun gear |
| Forward fourth | O | — | — | — | — | O | — | L | — | Second sun gear |
| (Forward fourth) | O | — | O | — | — | O | — | — | — | Second sun gear |
| Forward fifth | — | O | — | — | O | L | — | — | — | Second sun gear |
| (Forward fifth) | — | O | — | O | — | O | — | — | — | Second sun gear |
| Forward sixth | O | O | — | — | — | O | — | — | — | Second sun gear |
| Forward seventh | — | — | — | — | O | O | L | — | — | Planet carrier & Second sun gear |
| Forward eighth | O | — | — | — | O | O | — | — | — | Planet carrier & Second sun gear |

Herein, "O" means an operating state, and "L" means a locking state.

Similar to the gear train according to the third embodiment of the present invention, the gear train according to the fifth embodiment of the present invention can be used for transmissions capable of providing five forward-speeds and two reverse-speeds or six forward-speeds and two reverse-speeds. Tables 16 and 17 show operational states of control elements when the gear train is used for such transmissions.

TABLE 16

| Gear step (Engine brake) | Brake | | | Clutch | | | One-way clutch | | | Output element |
|---|---|---|---|---|---|---|---|---|---|---|
| | SP | 1st | 2nd | SP | 1st | 2nd | SP | 1st | 2nd | |
| Parking | — | — | — | — | — | — | L | — | — | |
| Reverse First | — | — | O | — | O | — | L | — | — | Planet carrier |
| Second | O | — | O | — | O | — | — | — | — | Planet carrier |
| Neutral | — | — | — | — | — | — | L | — | — | |
| Forward first | — | O | — | — | — | — | L | — | L | Planet carrier |
| (Forward first) | — | O | — | O | O | — | — | — | — | Planet carrier |
| Forward second | — | — | — | — | — | O | L | L | — | Second sun gear |
| (Forward second) | — | — | O | O | — | O | — | — | — | Second sun gear |
| Forward third | — | O | — | — | — | O | L | — | — | Second sun gear |
| (Forward third) | — | O | — | O | — | O | — | — | — | Second sun gear |
| Forward fourth | — | — | — | — | O | O | L | — | — | Planet carrier & Second sun gear |
| Forward fifth | O | — | — | — | O | O | — | — | — | Planet carrier & Second sun gear |

Herein, "O" means an operating state, and "L" means a locking state.

TABLE 17

| Gear step (Engine brake) | | Brake | | | Clutch | | | One-way clutch | | | Output element |
|---|---|---|---|---|---|---|---|---|---|---|---|
| | | SP | 1st | 2nd | SP | 1st | 2nd | SP | 1st | 2nd | |
| Parking | | — | — | — | — | — | — | L | — | — | — |
| Reverse | First | — | — | O | — | O | — | L | — | — | Planet carrier |
| | Second | O | — | O | — | O | — | — | — | — | Planet carrier |
| Neutral | | — | — | — | — | — | — | L | — | — | — |
| Forward first | | — | O | — | — | — | — | L | — | L | Planet carrier |
| (Forward first) | | — | O | — | O | O | — | — | — | — | Planet carrier |
| Forward second | | — | — | — | — | — | O | L | L | — | Second sun gear |
| (Forward second) | | — | — | O | O | — | O | — | — | — | Second sun gear |
| Forward third | | — | O | — | — | — | O | L | — | — | Second sun gear |
| (Forward third) | | — | O | — | O | — | O | — | — | — | Second sun gear |
| Forward fourth | | O | O | — | — | — | O | — | — | — | Second sun gear |
| Forward fifth | | — | — | — | — | O | O | L | — | — | Planet carrier & Second sun gear |
| Forward sixth | | O | — | — | — | O | O | — | — | — | Planet carrier & Second sun gear |

Herein, "O" means an operating state, and "L" means a locking state.

The principle of the gear shift operation according to the fifth embodiment of the present invention is identical to that of the third embodiment, except that the frequency of engagement of friction elements 643, 651 and 653 is reduced due to the one-way clutches 655, 656 and 657. Thus, tables 6, 7, 9, 10, 12 and 13, and equations 2, 3 and 4 represented in the third embodiment of the present invention can be applied to the fifth embodiment of the present invention without any modification thereof.

Although the gear train according to the fifth embodiment of the present invention has six friction elements and three one-way clutches as control members, more friction element or one-way clutch may be added to the gear train of the present embodiment in order to soften the gear shift shock or to disperse forces. In addition, the gear train of the present embodiment may be formed with one or two among the three one-way clutches in order to reduce the size and weight of the gear train.

Embodiment 6

FIG. 8 is a partially sectional view showing a gear train of an automatic transmission according to a sixth embodiment of the present invention.

The sixth embodiment of the present invention is similar to the fifth embodiment of the present invention except for arrangement order of an SP gear set and a compound planetary gear set, which is the same as the relationship between the third and fourth embodiments.

Referring to FIG. 8, the gear train according to the sixth embodiment of the present invention includes an input shaft 701, a compound planetary gear set 700, an intermediate shaft 705, an SP gear set 770, an output shaft 709, three brakes 741 to 743, three clutches 751 to 753 and three one-way clutches 755 to 757.

The first one-way clutch 755 and the second brake 742 are positioned in parallel between a second ring gear 727 and the transmission case. The second one-way clutch 756 and the first clutch 751 are positioned in parallel between the planet carrier 730 and the intermediate shaft 705. The SP one-way clutch 757 is positioned between the intermediate shaft 705 or the SP carrier 733 and the SP ring gear 777 or the output shaft 709.

The first one-way clutch 755 may reduce the frequency of the use of the second brake 742, and the second one-way clutch 756 may reduce the frequency of the use of the first clutch 751. The SP one-way clutch may reduce the frequency of the use of the SP clutch 753. However, different from the fifth embodiment of the present invention, the SP clutch 753 must be operated to provide the first reverse-speed. According to the sixth embodiment of the present invention, when the planet carrier 730 generates a reverse output by rotating in the negative direction, the intermediate shaft 705 and the SP carrier 733 also rotate in the negative direction so that the SP one-way clutch 757 is unlocked.

Table 18 shows operational states of control elements for allowing the gear train according to the sixth embodiment of the present invention to provide eight forward-speeds and two reverse-speeds.

TABLE 18

| Gear step (Engine brake) | | Brake | | | Clutch | | | One-way clutch | | | Output element |
|---|---|---|---|---|---|---|---|---|---|---|---|
| | | SP | 1st | 2nd | SP | 1st | 2nd | SP | 1st | 2nd | |
| Parking | | — | — | — | — | — | — | — | — | — | — |
| Reverse | First | — | — | O | O | O | — | — | — | — | SP ring gear |
| | Second | O | — | O | — | O | — | — | — | — | SP ring gear |
| Neutral | | — | — | — | — | — | — | — | — | — | — |
| Forward first | | — | O | — | — | — | — | L | — | L | SP ring gear |
| (Forward first) | | — | O | — | O | O | — | — | — | — | SP ring gear |
| Forward second | | O | O | — | — | — | — | — | — | L | SP ring gear |
| (Forward second) | | O | O | — | — | O | — | — | — | — | SP ring gear |
| Forward third | | — | — | — | — | O | O | L | — | SP ring gear |
| (Forward third) | | — | — | O | O | — | O | — | — | — | SP ring gear |
| Forward fourth | | O | — | — | — | O | — | L | — | SP ring gear |
| (Forward fourth) | | O | — | O | — | — | O | — | — | — | SP ring gear |
| Forward fifth | | — | O | — | — | O | L | — | — | SP ring gear |

TABLE 18-continued

| Gear step(Engine brake) | Brake | | | Clutch | | | One-way clutch | | | Output element |
|---|---|---|---|---|---|---|---|---|---|---|
| | SP | 1st | 2nd | SP | 1st | 2nd | SP | 1st | 2nd | |
| (Forward fifth) | — | O | — | O | — | O | — | — | — | SP ring gear |
| Forward sixth | O | O | — | — | — | O | — | — | — | SP ring gear |
| Forward seventh | — | — | — | — | O | O | L | — | — | SP ring gear |
| Forward eighth | O | — | — | — | O | O | — | — | — | SP ring gear |

Herein, "O" means an operating state, and "L" means a locking state.

Similar to the gear train of the third embodiment, the gear train according to the sixth embodiment of the present invention is adaptable for five-speed or six-speed transmissions. Tables 19 and 20 show operational states of control elements of each gear step when the gear train is used for a transmission providing five forward-speeds and two reverse-speeds, and for a transmission providing six forward-speeds and two reverse-speeds.

TABLE 19

| Gear step(Engine brake) | Brake | | | Clutch | | | One-way clutch | | | Output |
|---|---|---|---|---|---|---|---|---|---|---|
| | SP | 1st | 2nd | SP | 1st | 2nd | SP | 1st | 2nd | element |
| Parking Reverse First | — | — | O | O | O | — | — | — | — | SP ring gear |
| Second | O | — | O | — | O | — | — | — | — | SP ring gear |
| Neutral | — | — | — | — | — | — | — | — | — | — |
| Forward first | — | O | — | — | — | — | L | — | L | SP ring gear |
| (Forward first) | — | O | — | O | O | — | — | — | — | SP ring gear |
| Forward second | — | — | — | — | — | O | L | L | — | SP ring gear |
| (Forward second) | — | — | O | O | — | O | — | — | — | SP ring gear |
| Forward third | — | O | — | — | — | O | L | — | — | SP ring gear |
| (Forward third) | — | O | — | O | — | O | — | — | — | SP ring gear |
| Forward fourth | — | — | — | — | O | O | L | — | — | SP ring gear |
| Forward fifth | O | — | — | — | O | O | — | — | — | SP ring gear |

Herein, "O" means an operating state, and "L" means a locking state.

TABLE 20

| Gear step(Engine brake) | Brake | | | Clutch | | | One-way clutch | | | Output |
|---|---|---|---|---|---|---|---|---|---|---|
| | SP | 1st | 2nd | SP | 1st | 2nd | SP | 1st | 2nd | element |
| Parking Reverse First | — | — | O | O | O | — | — | — | — | SP ring gear |
| Second | O | — | O | — | O | — | — | — | — | SP ring gear |
| Neutral | — | — | — | — | — | — | — | — | — | — |
| Forward first | — | O | — | — | — | — | L | — | L | SP ring gear |
| (Forward first) | — | O | — | O | O | — | — | — | — | SP ring gear |
| Forward second | — | — | — | — | — | O | L | L | — | SP ring gear |
| (Forward second) | — | — | O | O | — | O | — | — | — | SP ring gear |
| Forward third | — | O | — | — | O | L | — | — | — | SP ring gear |
| (Forward third) | — | O | — | O | — | O | — | — | — | SP ring gear |
| Forward fourth | O | O | — | — | — | O | — | — | — | SP ring gear |
| Forward fifth | — | — | — | — | O | O | L | — | — | SP ring gear |
| Forward sixth | O | — | — | — | O | O | — | — | — | SP ring gear |

Herein, "O" means an operating state, and "L" means a locking state.

Thus, tables 6, 7, 9, 10, 12 and 13, and equations 2, 3 and 4 represented in the third embodiment of the present invention can be applied to the sixth embodiment of the present invention without any modification thereof.

As described above, the gear train of the fourth embodiment has a structural disadvantage as compared with the gear train of the third embodiment. Similarly, the gear train of the sixth embodiment has a structural disadvantage as compared with the gear train of the fifth embodiment. According to the fifth embodiment of the present invention, torque converted by the torque converter is inputted into the SP gear set 660. In contrast, according to the sixth embodiment of the present invention, torque from the torque converter is multiplied by the compound planetary gear set 700 so that the SP gear set 770 is fed with torque greater than the case of the fifth embodiment. Thus, not only the SP gear set 770, but also the intermediate shaft 705, the SP brake 743, the SP clutch 753, and the SP one-way clutch 757 of the gear train according to the sixth embodiment of the present invention must have reinforced structures as compared with the fifth embodiment. Accordingly, the length and weight of the gear train may be increased. Due to such a structural handicap of the gear train of the sixth embodiment, the gear train of the fifth embodiment is more adaptable for practical use.

Similar to the gear train of the fifth embodiment, the gear train of the sixth embodiment includes six friction elements and three one-way clutches as control elements. However, the gear train may be formed with one or two among the three one-way clutches in order to reduce the size and weight of the gear train.

Embodiment 7

FIG. 9 is a partially sectional view showing a gear train of an automatic transmission according to a seventh embodiment of the present invention. The gear train according to the seventh embodiment of the present invention is achieved by changing output direction of the gear train of the third embodiment so that the gear train may be adaptable for a front-wheel drive vehicle.

Referring to FIGS. 5 and 9, the gear train according to the seventh embodiment of the present invention includes all components of the gear train according to the third embodiment of the present invention. However, the gear train of the seventh embodiment additionally includes a transfer driving gear 881, a transfer driven gear 882, an output shaft 809, and an output gear 890 connected to the transfer driven gear 882 through the output shaft 809 for driving a differential gear.

The gear train of the seventh embodiment includes a compound planetary gear set 800 having a single planetary gear part 810 and a double planetary gear part 820, which are arrayed in transposed order compared with that of the third embodiment.

Functioning of the gear train according to the seventh embodiment of the present invention is identical to that of the gear train according to the third embodiment of the present invention. Accordingly, the gear shifting procedures and related components described with reference to the third embodiment are applied to the seventh embodiment of the present invention without any modification. In addition, the tables and equations represented in the third embodiment are also applied to the seventh embodiment of the present invention.

An arrangement in which three one-way clutches are added to the gear train of the seventh embodiment will make another gear train into which the gear train of the fifth embodiment is transformed to be adaptable for front-wheel drive vehicles. Such an arrangement will not be separately explained as an embodiment of the present invention.

Embodiment 8

FIG. 10 is a partially sectional view showing a gear train of an automatic transmission according to an eighth embodiment of the present invention. The gear train according to the eighth embodiment of the present invention can be achieved by changing an output direction of the gear train of the fourth embodiment so that the gear train may be adaptable for a front-wheel drive vehicle.

Referring to FIGS. 6 and 10, the gear train according to the eighth embodiment of the present invention includes all components of the fourth embodiment as well as a transfer driving gear 981, a transfer driven gear 982, an output shaft 909, and an output gear 990 for driving a differential gear.

Mounting of an SP gear set 970 in the gear train according to the eighth embodiment of the present invention is different from that of the fourth embodiment. That is, an output section connected to an SP ring gear 977 faces a compound planetary gear set 900 so that the transfer driving gear 981 is positioned between the compound planetary gear set 900 and the SP gear set 970.

The gear train according to the eighth embodiment of the present invention performs its functioning in a way identical to that of the fourth embodiment. Accordingly, the gear shift procedures described with reference to the fourth embodiment are applied to the eighth embodiment without any modifications so that it will not be further described below.

As mentioned above, the gear train of the fourth embodiment has a structural disadvantage as compared with the gear train of the third embodiment. Similarly, the gear train of the eighth embodiment has a structural disadvantage as compared with the gear train of the seventh embodiment. Thus, not only the SP gear set 970, but also an intermediate shaft 905 and an SP brake 943 of the eighth embodiment must be reinforced.

An arrangement in which three one-way clutches are added to the gear train of the eighth embodiment will make another gear train into which the gear train of the sixth embodiment is transformed to be adaptable for front-wheel drive cars. Such an arrangement will not be further explained as an embodiment of the present invention.

Embodiment 9

FIG. 11 is a partially sectional view showing a gear train of an automatic transmission according to a ninth embodiment of the present invention.

Referring to FIGS. 5 and 11, the gear train according to the ninth embodiment of the present invention includes all components of the third embodiment as well as a transfer driving gear 1081, a transfer driven gear 1082, and an output gear 1090 for driving a differential gear.

The gear train of the seventh embodiment has a length longer than length of the gear train of the third embodiment due to the transfer driving gear so that the gear train of the seventh embodiment may not be suitable for smaller cars.

The gear train according to the ninth embodiment of the present invention is achieved by rearranging the gear train of the third embodiment in order that the gear train may be adaptable for front-wheel drive type vehicles requiring shorter gear trains.

However, since an SP gear set 1060 and a compound planetary gear set 1000 are arrayed in parallel, width of the transmission may be enlarged while the length of the gear train becomes reduced.

Referring again to FIGS. 5 and 11, different from the gear train of the third embodiment including one intermediate shaft 405, the gear train of the ninth embodiment has two intermediate shafts 1005 and 1007.

According to the third embodiment, output speed of the SP gear set 460 is directly transferred to the compound planetary gear set 400 without changing a rotational direction thereof. However, according to the ninth embodiment of the present invention, the rotational direction of output speed of the SP gear set 1060 is changed due to an engagement between transfer gears 1081 and 1082 before the output speed of the SP gear set 1060 is transmitted to the compound planetary gear set 1000.

When sprockets are used instead of the transfer gears 1081 and 1082 and power is transferred through a chain, the rotational direction of the output speed of the SP gear set 1060 will not be changed.

The torque conversion procedure of the compound planetary gear set 1000 is not affected by the rotational direction of input torque so that the gear shift procedure and an operational relationship between control elements of the ninth embodiment are the same as those of the third embodiment.

The ninth embodiment of the present invention is similar to the third embodiment except for the structural difference explained above so that functioning of the gear train of the tenth embodiment will not be explained to avoid redundancy.

In order to allow the gear train of the fifth embodiment have a short length and adaptable for a front-wheel drive type vehicle, the SP gear set 660 and the compound planetary gear set 600 of the fifth embodiment must be arranged in parallel, and power transmission between the SP gear set 660 and the compound planetary gear set 600 must be carried out through transfer gears.

An arrangement in which three one-way clutches are added to the ninth embodiment will make another gear train into which the gear train of the fifth embodiment is transformed. Such an arrangement will not be further explained as an embodiment of the present invention.

Embodiment 10

FIG. 12 is a partially sectional view showing a gear train of an automatic transmission according to a tenth embodiment of the present invention.

Referring to FIGS. 6 and 12, the gear train according to the tenth embodiment of the present invention includes all components of the fourth embodiment as well as a transfer driving gear 1181, a transfer driven gear 1182, and an output gear 1190.

Although the gear train of the eighth embodiment is accomplished by rearranging the gear train of the fourth embodiment in order that the gear train may be adaptable for front-wheel drive type vehicles, excessive length may cause a difficulty in utilizing the gear train of the eighth embodiment.

The gear train according to the tenth embodiment of the present invention is achieved by rearranging the gear train of the fourth embodiment in order that the gear train may be adaptable for front-wheel drive type vehicles with a length shorter than that of the eighth embodiment.

Referring again to FIGS. 6 and 12, different from the gear train of the fourth embodiment including one intermediate shaft 505, the gear train of the tenth embodiment has two intermediate shafts 1106 and 1107. The rotational direction of output speed of a compound planetary gear set 1100 is changed due to transfer gears 1181 and 1182 before the output speed is inputted into an SP gear set 1170. When sprockets are used instead of the transfer gears 1181 and 1182 and power is transferred through a chain, the rotational direction of the output force is unchanged.

The gear shift procedure for the SP gear set 1170 has no relationship with the rotational direction of input speed so that the gear shift procedure and operational relationship between control elements of the tenth embodiment are the same as those of the fourth embodiment.

The tenth embodiment of the present invention is similar to the fourth embodiment except for the above described structural difference so that functioning of the gear train of the tenth embodiment will not be explained to avoid redundancy.

In order to transform the gear train of the sixth embodiment to have a shorter length and to be adapted for front-wheel drive type vehicles, three one-way clutches are added to the gear train of the tenth embodiment. However, this kind of gear train arrangement will not be explained as an embodiment of the present invention.

INDUSTRIAL APPLICABILITY

As can be seen from the foregoing, according to the present invention, first and second planetary gears with different diameters are formed integrally and in alignment with each other, thereby generating four forward-speeds and one reverse-speed. In this case, step ratios between gear steps can be uniformly composed and the compound planetary gear set can be controlled by using four friction elements only.

In addition, the simple planetary gear set capable of generating direct drive output speed and over-drive output speed is coupled with the compound planetary gear set so that the engine power may be converted into eight forward-speeds and two reverse-speeds in maximum. In this case, step ratios between gear steps can be uniformly composed and the gear train of the automatic transmission can be controlled by using six friction elements.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A gear train comprising:
an input shaft for receiving engine power; a single planetary gear part including a first sun gear coupled with the input shaft, a plurality of first planetary gears meshed with the first sun gear, and a first ring gear meshed with the first planetary gears;
a double planetary gear part including a second sun gear, a plurality of second planetary gears meshed with the second sun gear, formed integrally and in alignment with the first planetary gears and having diameters different from diameters of the first planetary gears, a plurality of third planetary gears meshed with the second planetary gears, and a second ring gear meshed with the third planetary gears while accommodating the third planetary gears therein;
a planet carrier for rotatably supporting the first to third planetary gears;
a first brake for selectively stopping the rotation of the first ring gear; a second brake for selectively stopping the rotation of the second ring gear; an output shaft selectively coupled with the planet carrier and/or the second sun gear;
a first clutch for coupling/decoupling the planet carrier with/from the output shaft;
and a second clutch for coupling/decoupling the second sun gear with/from the output shaft.

2. The gear train of claim 1, wherein a diameter of the first sun gear is smaller than that of the second sun gear, and the second planetary gears are integrally formed with the first planetary gears.

3. The gear train of claim 1, further comprising a first one-way clutch installed between the second ring gear and a transmission case for preventing the second ring gear from rotating in a negative direction.

4. The gear train of claim 3, further comprising a second one-way clutch installed between the planet carrier and the output shaft for preventing the output shaft from rotating slower than the planet carrier.

5. A gear train comprising:
an input shaft for receiving engine power; a simple planetary gear set including an SP sun gear, a plurality of SP planetary gears meshed with the SP sun gear, an SP planetary ring gear meshed with the SP gears, and an SP carrier coupled with the input shaft and rotatably supporting the SP planetary gears;

a compound planetary gear set including a first sun gear, a plurality of first planetary gears meshed with the first sun gear, a first ring gear meshed with the first planetary gears, a second sun gear, a plurality of second planetary gears meshed with the second sun gear, formed integrally and in alignment with the first planetary gears and having diameters different from diameters of the first planetary gears, a plurality of third planetary gears meshed with the second planetary gears, a second ring gear meshed with the third planetary gears, and a planet carrier for rotatably supporting the first to third planetary gears;

an intermediate shaft for connecting the SP ring gear to the first sun gear; an output shaft selectively coupled with the planetary carrier and/or the second sun gear;

an SP brake for selectively braking the SP sun gear; a first brake for selectively braking the first ring gear;

a second brake for selectively braking the second ring gear;

an SP clutch for coupling/decoupling the input shaft to/from the SP sun gear; a first clutch for coupling/decoupling the planet carrier to/from the output shaft;

and a second clutch for coupling/decoupling the second sun gear to/from the output shaft.

6. The gear train of claim 5, wherein a diameter of the first sun gear is smaller than that of the second sun gear, and the second planetary gears are integrally formed with the first planetary gears.

7. The gear train of claim 5, further comprising an SP one-way clutch installed between the input shaft and the intermediate shaft for preventing the intermediate shaft from rotating slower than the input shaft.

8. The gear train of claim 7, further comprising a first one-way clutch installed between the second ring gear and a transmission case for preventing the second ring gear from rotating in a negative direction.

9. The gear train of claim 8, further comprising a second one-way clutch installed between the planet carrier and the output shaft for preventing the output shaft from rotating slower than the planet carrier.

10. The gear train of claim 5, further comprising an SP one-way clutch installed between the input shaft and the SP sun gear for preventing the SP sun gear from rotating slower than the input shaft.

11. The gear train of claim 10, further comprising a first one-way clutch installed between the second ring gear and a transmission case for preventing the second ring gear from rotating in a negative direction.

12. The gear train of claim 11, further comprising a second one-way clutch installed between the planet carrier and the output shaft for preventing the output shaft from rotating slower than the planet carrier.

13. A gear train comprising:

an input shaft for receiving engine power;

a simple planetary gear set including an SP sun gear, a plurality of SP planetary gears meshed with the SP sun gear, an SP ring gear meshed with the SP planetary gears, and an SP carrier connected to the input shaft for rotatably supporting the SP planetary gears;

a first intermediate shaft connected to the SP ring gear;

a transfer driving gear driven by the first intermediate shaft;

a transfer driven gear engaged with the transfer driving gear;

a second intermediate shaft disposed parallel to the first intermediate shaft and fixedly connected to the transfer driven gear;

a compound planetary gear set including a first sun gear connected to the second intermediate shaft, a plurality of first planetary gears meshed with the first sun gear, a first ring gear meshed with the first planetary gears, a second sun gear, a plurality of second planetary gears meshed with the second sun gear, formed integrally and in alignment with the first planetary gears and having diameters different from diameters of the first planetary gears, a plurality of third planetary gears meshed with the second planetary gears, a second ring gear meshed with the third planetary gears, and a planet carrier for rotatably supporting the first to third planetary gears;

an output shaft selectively coupled with the compound planet carrier and/or the second sun gear; an SP brake for selectively braking the SP sun gear;

a first brake for selectively braking the first ring gear; a second brake for selectively braking the second ring gear;

an SP clutch for coupling/decoupling the input shaft to/from the SP sun gear; a first clutch for coupling/decoupling the planet carrier to/from the output shaft;

and a second clutch for coupling/decoupling the second sun gear to/from the output shaft.

14. The gear train of claim 13, wherein a diameter of the first sun gear is smaller than that of the second sun gear, and the second planetary gears are integrally formed with the first planetary gears.

* * * * *